(12) United States Patent
Matsui et al.

(10) Patent No.: US 12,409,459 B2
(45) Date of Patent: Sep. 9, 2025

(54) BRUSH DEVICE FOR CHARGING AIRBORNE PARTICLES OR ELIMINATING STATIC ELECTRICITY OF PARTICLES BY CORONA DISCHARGE, ELECTROSTATIC PRECIPITATOR INCLUDING THE BRUSH DEVICE AND AIR CLEANER INCLUDING THE BRUSH DEVICE

(71) Applicant: AMANO CORPORATION, Kanagawa (JP)

(72) Inventors: Tsuyoshi Matsui, Hamamatsu (JP); Tetsuya Sato, Hamamatsu (JP); Shohei Nakagawa, Hamamatsu (JP)

(73) Assignee: AMANO CORPORATION, Kanagawa (JP)

( * ) Notice: Subject to any disclaimer, the term of this patent is extended or adjusted under 35 U.S.C. 154(b) by 400 days.

(21) Appl. No.: 18/058,719

(22) Filed: Nov. 23, 2022

(65) Prior Publication Data
US 2023/0173506 A1    Jun. 8, 2023

(30) Foreign Application Priority Data
Dec. 8, 2021 (JP) ................. 2021-199120

(51) Int. Cl.
*B03C 3/38* (2006.01)
*B03C 3/12* (2006.01)

(52) U.S. Cl.
CPC ............... *B03C 3/38* (2013.01); *B03C 3/12* (2013.01); *B03C 2201/04* (2013.01)

(58) Field of Classification Search
CPC .... B03C 3/41; B03C 3/38; B03C 3/12; B03C 3/368; B03C 3/68; B03C 3/08; B03C 3/47; B03C 3/60; B03C 3/86; B03C 2201/04; B03C 2201/10; Y02A 50/2351;
(Continued)

(56) References Cited

U.S. PATENT DOCUMENTS 3,819,985 A * 6/1974 Dusevoir .................. B03C 3/41
96/96
3,911,566 A * 10/1975 Dusevoir .................. B03C 3/41
53/118
(Continued)

FOREIGN PATENT DOCUMENTS

JP      08112549 A  * 10/1994
JP      H08-112549 A   5/1996
(Continued)

*Primary Examiner* — Jennifer Dieterle
*Assistant Examiner* — Sonji Turner
(74) *Attorney, Agent, or Firm* — Studebaker Brackett PLLC

(57) ABSTRACT

The brush device comprises: a plurality of discharge brushes formed by bundling fibrous wire electrodes; a strip-shaped support board including a first plate-shaped member and a second plate-shaped member which hold the discharge brushes from both sides; and a joining means for joining the first plate-shaped member and the second plate-shaped member. The discharge brushes are disposed at intervals in a longitudinal direction of the support board with their tip end portions protruding from the support board along a width direction of the support board, and the joining means is disposed adjacent to each of the discharge brushes.

20 Claims, 17 Drawing Sheets

(58) Field of Classification Search
CPC ..... H05F 3/04; H05F 3/02; H05F 3/00; H01T 19/00; H01T 19/04
See application file for complete search history.

(56) References Cited

U.S. PATENT DOCUMENTS

| | | | | |
|---|---|---|---|---|
| 4,307,432 A | * | 12/1981 | Nishikawa | H05F 3/04 361/221 |
| 4,553,191 A | * | 11/1985 | Franks, Jr. | H05F 3/00 361/224 |
| 4,673,417 A | * | 6/1987 | Goransson | B03C 3/41 96/92 |
| 2011/0139009 A1 | * | 6/2011 | Nakahara | B03C 3/08 96/95 |

FOREIGN PATENT DOCUMENTS

| | | | | |
|---|---|---|---|---|
| JP | 2013212455 A | * | 10/2013 | |
| JP | 2016-107193 A | | 6/2016 | |
| JP | 2016195984 A | * | 11/2016 | ............... B03C 3/12 |
| WO | WO-2016163335 A1 | * | 10/2016 | ............... B03C 3/12 |

* cited by examiner

BRUSH DEVICE FOR CHARGING AIRBORNE PARTICLES OR ELIMINATING STATIC ELECTRICITY OF PARTICLES BY CORONA DISCHARGE, ELECTROSTATIC PRECIPITATOR INCLUDING THE BRUSH DEVICE AND AIR CLEANER INCLUDING THE BRUSH DEVICE

INCORPORATION BY REFERENCE

This application is based on and claims the benefits of priority from Japanese Patent Application No. 2021-199120 filed on Dec. 8, 2021, which is incorporated by reference in its entirety.

BACKGROUND

This invention relates to a brush device which charges particles such as dust in dust-containing air and mist in oily smoke by corona discharge generated by applying voltage, a brush device of a static eliminator which eliminates static electricity of charged particles, an electrostatic precipitator including the brush device, and an air cleaner including the brush device.

Generally, a device that charges airborne particles by corona discharge has been known.

For example, FIG. 4(*a*) of Patent Document 1 (Japanese Unexamined Patent Publication No. H8-112549) shows a corona discharge electrode in which equal-length carbon fiber bundles are disposed between two rectangular metal plates at equal intervals and a claw-shaped projection provided on a circumferential edge of one metal plate is bent to secure the metal plates to each other.

Also, FIG. 5 of Patent Document 2 (Japanese Unexamined Patent Publication No. 2016-107193) shows a brush-shaped electrode supported between U-shaped support plates.

However, in the invention disclosed in the above-mentioned Patent Document 1, the claw-shaped projection provided in one metal plate is not provided at all of the intervals of the carbon fiber bundles, and in FIG. 4(*a*), the claw-shaped projection is provided at only two intervals among the six intervals of the carbon fiber bundles. That is, since the claw-shaped projection is not provided at the intervals of the remaining four carbon fiber bundles, the four carbon fiber bundles without the claw-shaped projection are more likely to fall off from the metal plate or be shifted from the predetermined position compared with the two carbon fiber bundles with the claw-shaped projection.

In addition, in the invention disclosed in the above-mentioned Patent Document 2, it is structurally difficult for all brushes to improve and equalize the brush pullout strength and to prevent the brush from shifting from the predetermined position.

Furthermore, in the inventions disclosed in Patent Documents 1 and 2, when dirt adhering to the discharge brushes is removed by cleaning water or air blowing (blowing of compressed air) during maintenance of the discharge part, the discharge brushes bend or flex, and some wire electrodes of the discharge brush enter between the support plates or the U-shaped gap. As a result, the discharge points of the discharge brushes may decrease, resulting in a decrease in charge performance (discharge performance) and a decrease in collection performance (dust collection performance). Furthermore, if the wire electrodes of the discharge brushes enter the gap between the support plates, there is a risk that they will not be able to discharge.

The present invention is developed to solve the above problems and to provide a brush device, an electrostatic precipitator and an air cleaner capable of preventing the wire electrodes constituting the discharge brush from falling off the support board or being shifted from the predetermined position, to prevent the discharge point from decreasing and to prevent a decrease in charge performance (discharge performance) and collection performance (dust collection performance), even if pressure from cleaning water or air blowing or force in the tensile or compressive directions acts on the discharge brush when the brush device is maintained or cleaned.

SUMMARY OF THE INVENTION

In order to solve the above-mentioned problems, a first brush device of the invention is a brush device which charges airborne particles or eliminates static electricity of charged particles by corona discharge generated by applying voltage, and is characterized in that the brush device comprises: a plurality of discharge brushes formed by bundling fibrous wire electrodes; a strip-shaped support board including a first plate-shaped member and a second plate-shaped member which hold the discharge brushes from both sides; and a joining means for joining the first plate-shaped member and the second plate-shaped member, wherein the discharge brushes are disposed at intervals in a longitudinal direction of the support board with their tip end portions protruding from the support board along a width direction of the support board, and the joining means is disposed adjacent to each of the discharge brushes.

According to the first brush device of the present invention, the joining means is disposed adjacent to each discharge brush so that it becomes possible for all of the discharge brushes to improve the pullout strength and to prevent positional shift.

The second brush device of the present invention is characterized in that the joining means is disposed away from the discharge brushes on one side of each of the discharge brushes.

According to the second brush device of the present invention, it becomes possible to prevent the discharge brushes from falling off or being shifted from the support board without damaging or cutting the discharge brushes.

The third brush device of the present invention is characterized in that the joining means are disposed opposite to each other away from the discharge brushes on both sides of the discharge brushes.

According to the third brush device of the present invention, it becomes possible to enhance the effect to prevent the discharge brushes from falling off or being shifted from the support board without damaging or cutting the discharge brushes.

The fourth brush device of the present invention is characterized in that the support board is formed by joining the first plate-shaped member and the second plate-shaped member such that their fracture surfaces face each other.

According to the fourth brush device of the present invention, it becomes possible to prevent sparks (abnormal discharge) from occurring due to burrs on the fracture surfaces.

The fifth brush device of the present invention is characterized in that the support board is formed by caulking the first plate-shaped member and the second plate-shaped member.

According to the fifth brush device of the present invention, the first plate-shaped member and the second plate-shaped member can be firmly joined at a relatively low cost.

The sixth brush device of the present invention is characterized in that one of the first plate-shaped member and the second plate-shaped member is provided with a convex portion at a position where the discharge brush is disposed, and the other plate-shaped member is provided with an opening capable of being fitted into the convex portion.

According to the sixth brush device of the present invention, the convex portion creates a level difference in the mounting height of the discharge brushes and adds resistance, so that the discharge brushes can be hardly fallen off and a voltage can be stably applied to all the discharge brushes.

The seventh brush device of the present invention is characterized in that the convex portion is formed in a rectangular shape.

According to the seventh brush device of the present invention, all the wire electrodes of the discharge brush can be placed on the upper surface of the rectangular-shaped convex portion, so that the discharge brushes can be hardly fallen off.

The eighth brush device of the present invention is characterized in that the discharge brushes include a holding body holding the discharge brushes from both sides such that their tip end portions protrude, the holding body is disposed on an upper surface of the convex portion, and a height of the convex portion is set such that the holding body does not protrude from the opening when the first plate-shaped member and the second plate-shaped member are joined.

According to the eighth brush device of the present invention, it becomes possible to avoid damage to the holding body and the discharge brushes held by the holding body when the support board is handled.

The ninth brush device of the present invention is characterized in that the brush device further comprises an entering prevention means covering a gap formed between the first plate-shaped member and the second plate-shaped member which hold the discharge brushes, on an end surface in the width direction of the support board.

The tenth brush device of the present invention is characterized in that the entering prevention means includes a bent portion formed in an end portion in the width direction of at least one of the first plate-shaped member and the second plate-shaped member.

The eleventh brush device of the present invention is characterized in that a protrusion is formed in an end portion in the width direction of at least one of the first plate-shaped member and the second plate-shaped member to fill a gap formed between the adjacent bent portions.

According to the ninth to eleventh brush devices of the present invention, even if the discharge brushes are bent or flexed when dirt adhering to the discharge brushes is removed by cleaning water or air blow (compressed air jet), a part of the discharge brushes is prevented from entering into the gap between the plate-shaped members. Therefore, since a decrease in the number of discharge points can be prevented, a decrease in charge performance (discharge performance) and collection performance (dust collection performance) can be prevented.

The twelfth brush device of the present invention is characterized in that the brush device further comprises a first holding body and a second holding body which hold the discharge brushes from both sides such that tip end portions of the discharge brushes protrude, the first holding body is disposed facing the first plate-shaped member, the second holding body is disposed facing the second plate-shaped member, and a voltage is applied to at least one of the first holding body and the second holding body via a conductive adhesive layer.

According to the twelfth brush device of the present invention, the discharge brushes are held between the first holding body and the second holding body, so that the work of fixing the discharge brushes can be easily performed and the structure that makes it difficult for the discharge brushes to fall off from the support board can be realized at a relatively low cost. In addition, the structure is made relatively simple. Furthermore, since the conductive adhesive layer is provided, a voltage can be stably applied to all discharge brushes.

The thirteenth brush device of the present invention is characterized in that the discharge brush is formed by bundling 10 to 200 non-magnetic stainless steel fibrous wire electrodes each having a diameter of 5 to 25 µm.

According to the thirteenth brush device of the present invention, the discharge brushes (the bundle portions) formed by bundling the wire electrodes are easily separated, so that discharge performance can be enhanced. In addition, marketability and economic efficiency can be improved, as well as durability (rust resistance) and discharge performance (charge performance).

The electrostatic precipitator of the present invention is an electrostatic precipitator including one of the brush devices described above, and is characterized in that the electrostatic precipitator comprises a dust collecting part for collecting particles charged by the brush device; and a fan for drawing dust-containing air in, wherein the brush device and the dust collecting part are integrally formed, and the brush device, the dust collecting part and the fan are arranged in series in order from an upstream side in a flow direction of the dust-containing air.

According to the electrostatic precipitator on the present invention, by arranging the brush device, the dust collecting part and the fan in series, the height dimension of the electrostatic precipitator can be kept as low as possible. In addition, by shortening the longitudinal dimension of the brush device and integrally forming the brush device and the dust collecting part, the longitudinal dimension of the electrostatic precipitator can also be reduced, which allows for downsizing of the product.

The air cleaner of the present invention is an air cleaner including one of the brush devices described above, and is characterized in that the air cleaner comprises an air intake port; an exhaust port; a fan; and a dust collecting part, wherein dust and fine particles contained in air drawn in through the intake port by the fan are charged by the brush device, then adsorbed by the dust collecting part, and then clean air is discharged through the exhaust port.

According to the air cleaner of the present invention, particles including airborne dust and fine particles can be reliably charged and collected, and the dust collection efficiency can be improved.

According to the present invention, even if pressure from cleaning water or air blow or force in a tensile or compressive direction acts on the discharge brushes during maintenance or cleaning of the brush device, it becomes possible to prevent the wire electrodes constituting the discharge brushes from falling off the support board or being displaced from the predetermined position, and to prevent the discharge point from decreasing. Therefore, it becomes possible to prevent a decrease in the charge performance (discharge performance) and collection performance (dust collection performance), and various other excellent effects can be obtained.

DETAILED DESCRIPTION

Hereinafter, with reference to the drawings, the embodiment of the invention will be described.

[Entire Configuration of Electrostatic Precipitator]

Figure 1:
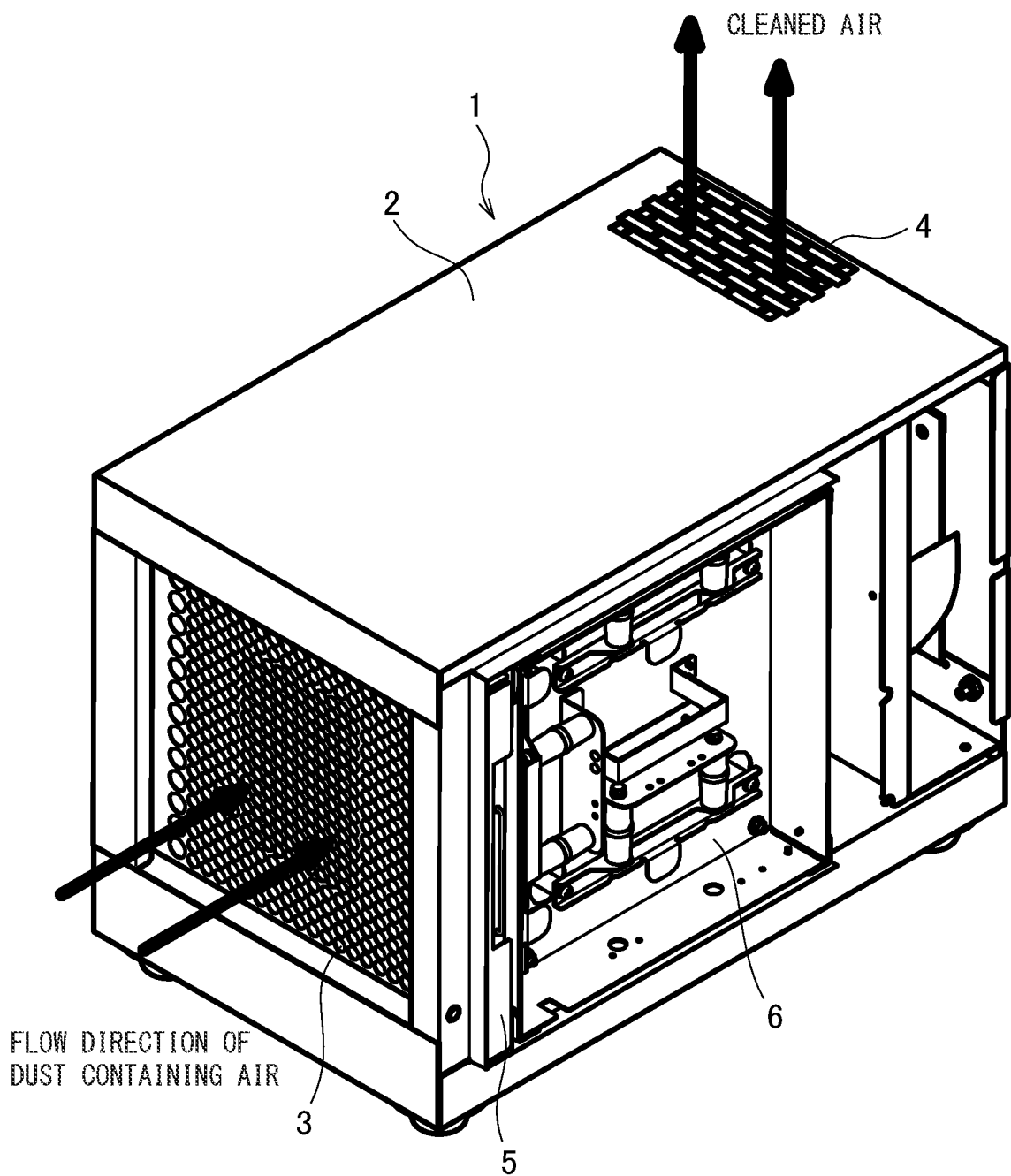
FIG. 1 is a perspective view showing the entire configuration of the electrostatic precipitator according to the embodiment of the present invention.

First, with reference to FIG. 1 to FIG. 3, the entire configuration of the electrostatic precipitator according to the embodiment of the present invention will be described. FIG. 1 is a perspective view showing the entire configuration of the electrostatic precipitator according to the embodiment of the present invention, FIG. 2 is a perspective view showing the charging and dust collecting part of the electrostatic precipitator according to the embodiment of the present invention, and FIG. 3 is a block diagram showing the configuration of the electrostatic precipitator according to the embodiment of the present invention.

As shown in FIG. 1, the electrostatic precipitator 1 according to the embodiment includes a main body case 2 having a parallelepiped shape. The main body case 2 has an air intake port 3 on the upstream side in the air flow direction (the left front side in FIG. 1), and an air intake duct (not shown) is connected to the air intake port 3. On the upper surface of the main body case 2, an exhaust port 4 is opened on the downstream side (the right rear side in FIG. 1) in the air flow direction.

Inside the main body case 2, a pre-filter 5, a charging and dust collecting part 6 and a fan 7 (see FIG. 3) are arranged in series in order along the air flow direction. A motor (not shown) is attached to the main body case 2 as the drive source for rotating the fan 7. On the front side of the main body case 2 (the right front side in FIG. 1), an opening/closing door (not shown) is attached in an openable and closable FIG. manner. 1 does not show the opening/closing door for convenience in order to view the inside state of the electrostatic precipitator 1.

Figure 2:
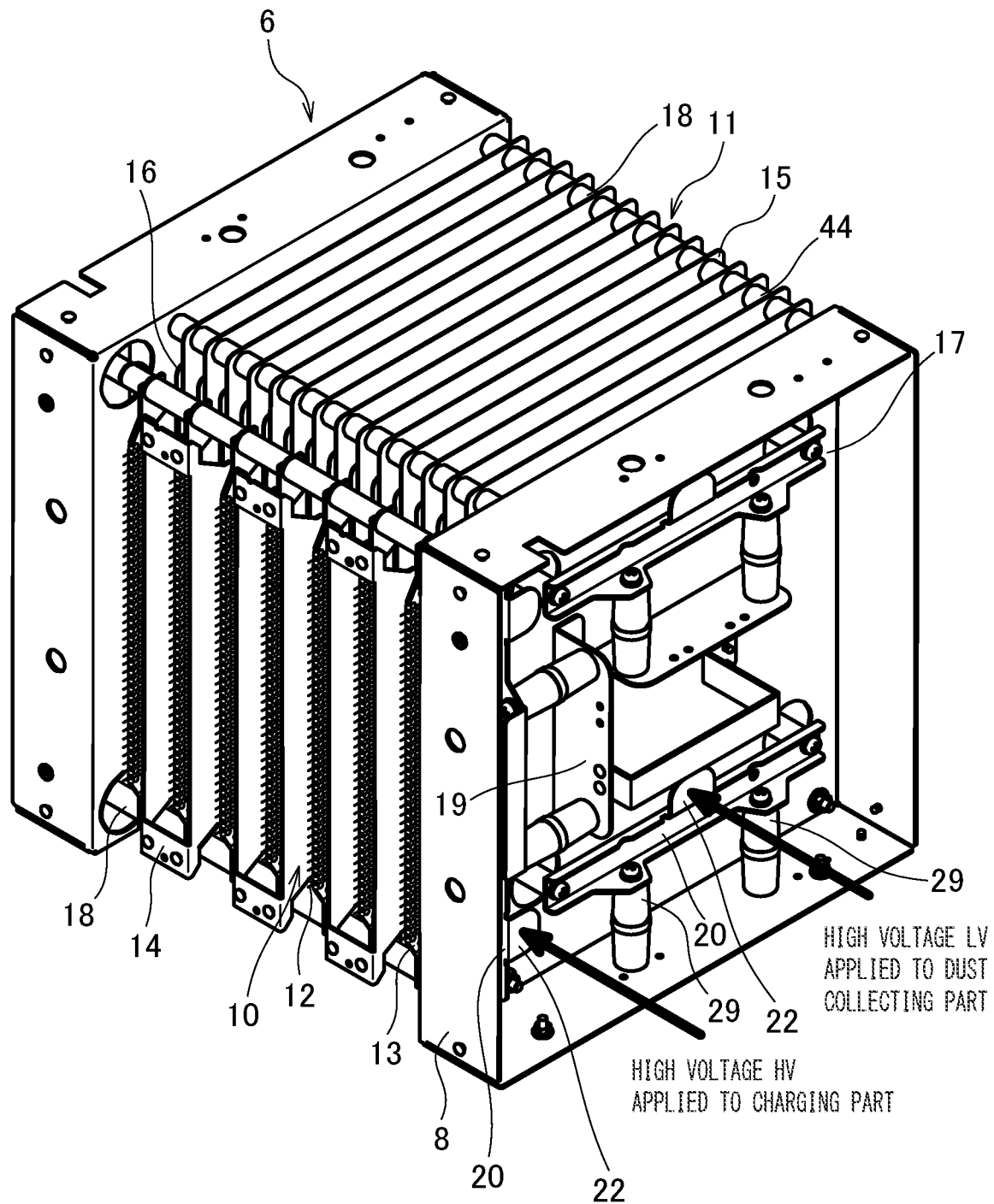
FIG. 2 is a perspective view showing the charging dust collecting part of the electrostatic precipitator according to the embodiment of the present invention.
Figure 3:
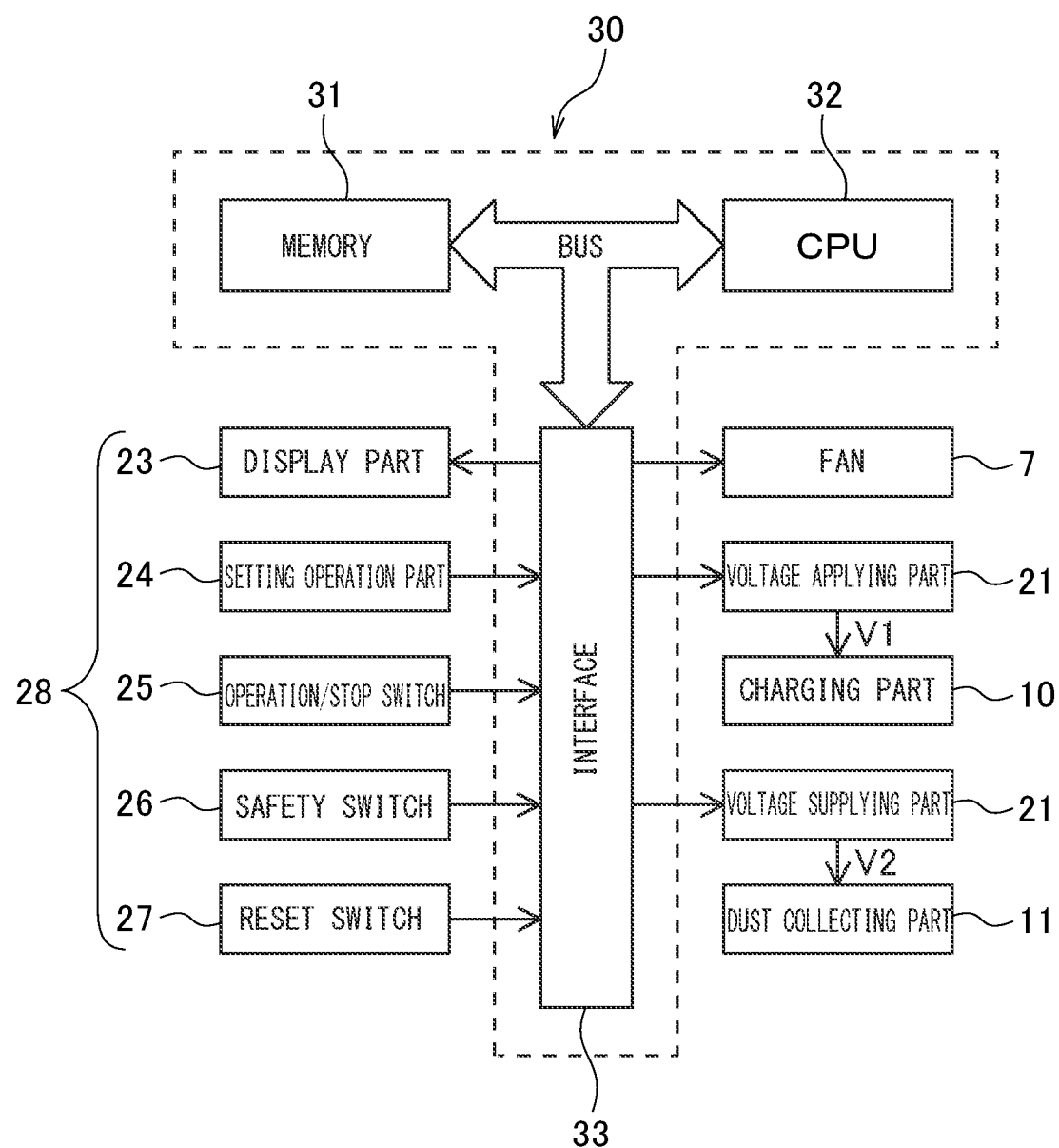
FIG. 3 is a block diagram showing the configuration of the electrostatic precipitator according to the embodiment of the present invention.
Figure 4:
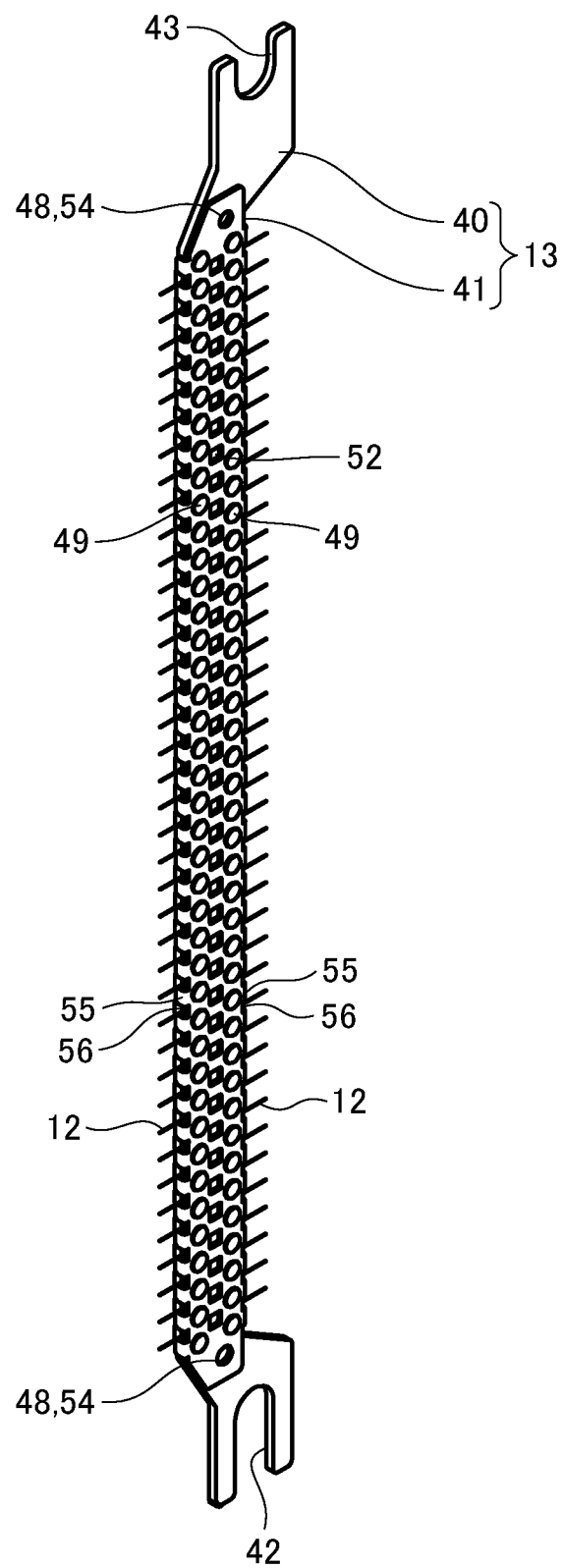
FIG. 4 is a perspective view showing the brush device of the electrostatic precipitator according to the embodiment of the present invention.
Figure 5:
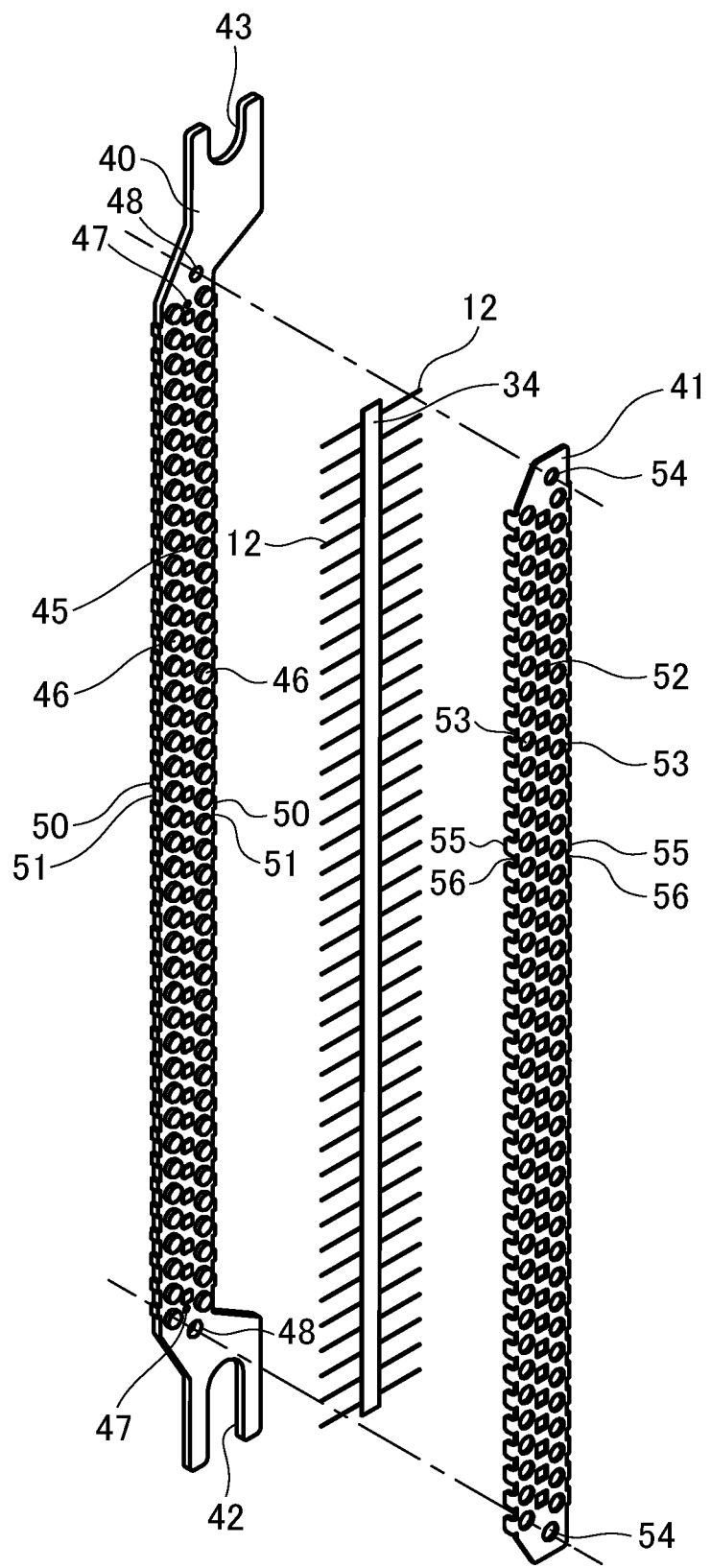
FIG. 5 is a disassembled perspective view showing the brush device of the electrostatic precipitator according to the embodiment of the present invention.
Figure 6:
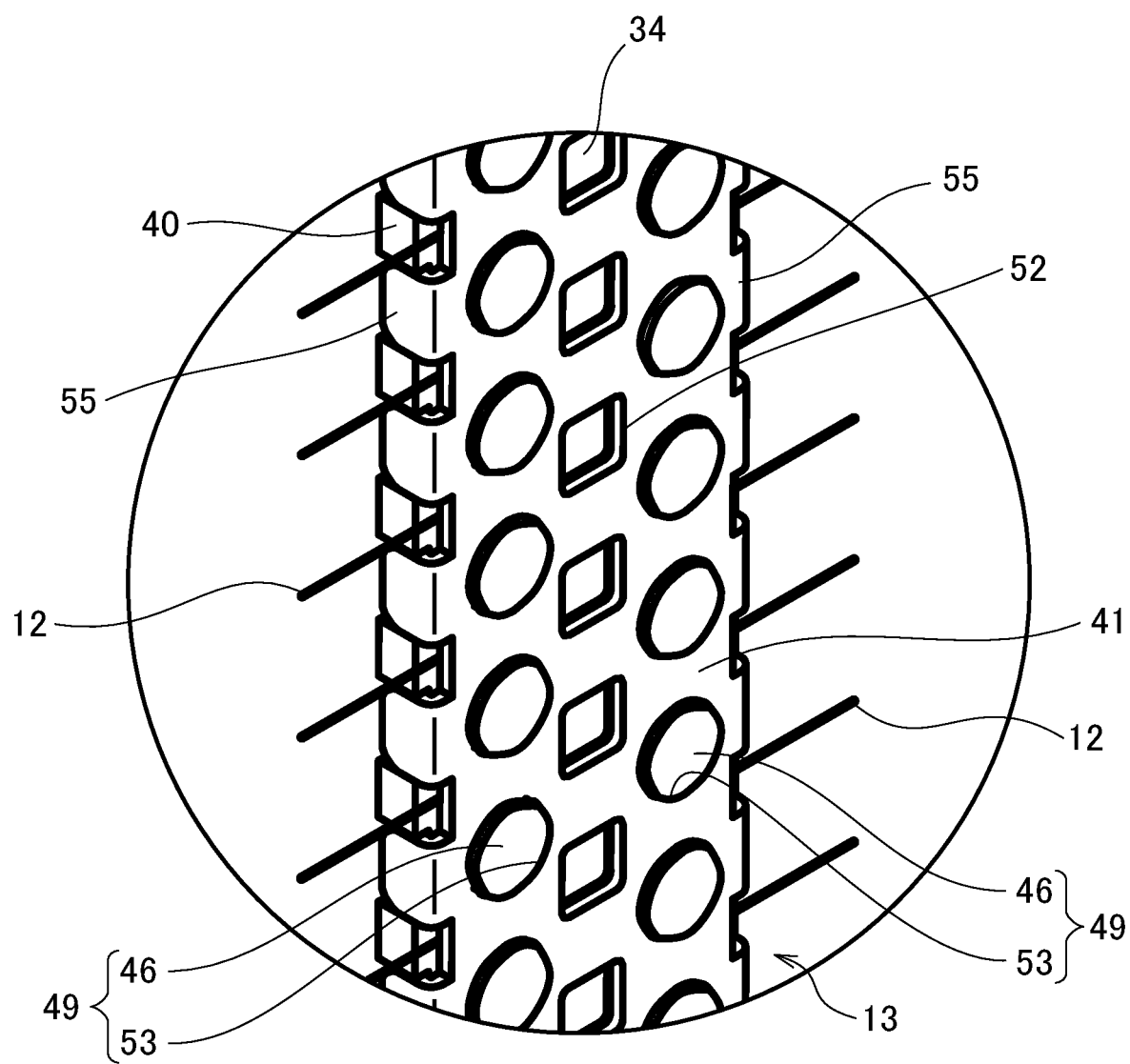
FIG. 6 is an enlarged perspective view showing a key part of the brush device of the electrostatic precipitator according to the embodiment of the present invention.
Figure 7:
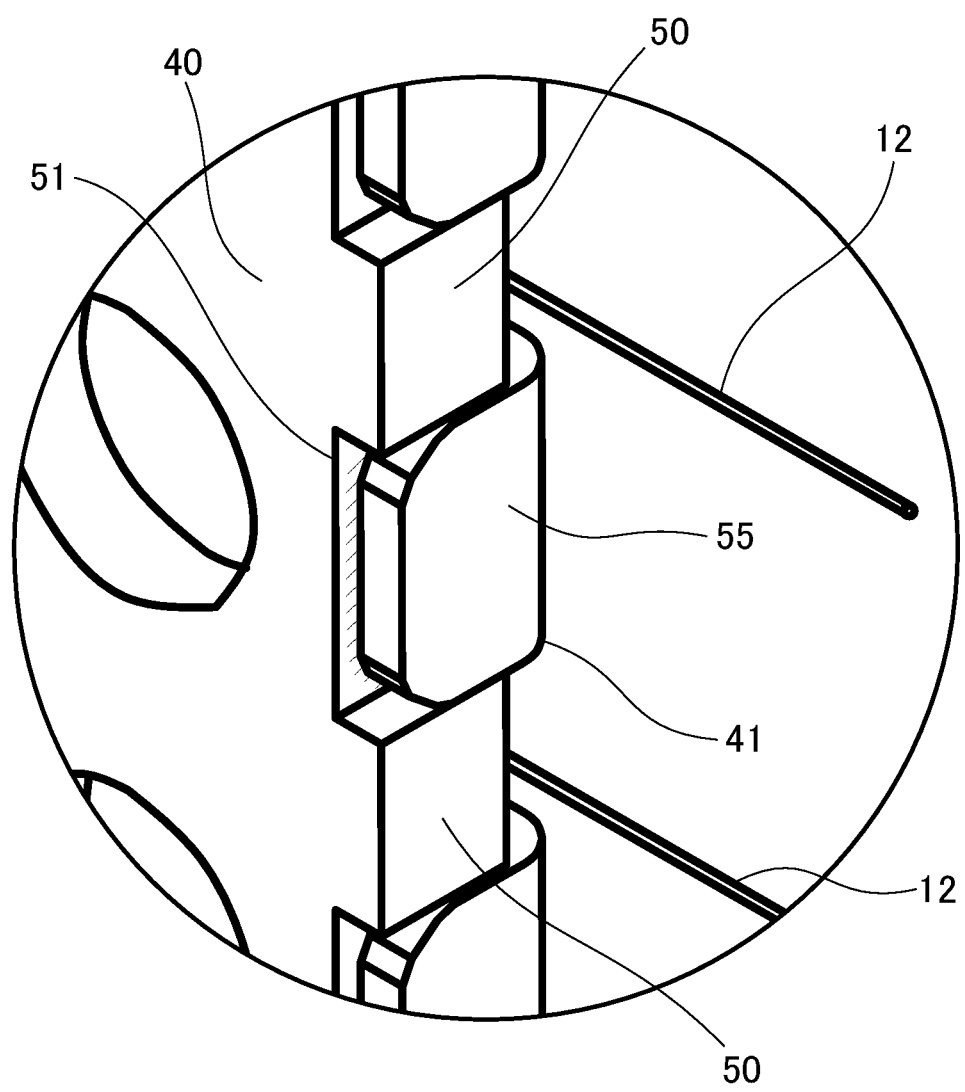
FIG. 7 is an enlarged perspective view showing the bent part of the brush device of the electrostatic precipitator according to the embodiment of the present invention.

As shown in FIG. 2, the charging and dust collecting part 6 is provided inside a frame 8 that forms the overall framework, has an approximately parallelepiped shaped appearance, and is formed by integrating a charging part 10 as the brush device and a dust collecting part 11.

The charging part (the brush device) 10 includes a plurality of discharge brushes 12, a plurality of support boards 13 supporting the discharge brushes 12, and a plurality of charging ground plates 14 (the ground electrodes) arranged parallel to the support boards 13 so as to face the support boards 13. An air flow path is formed between the support board 13 and the charging ground plate 14. The charging part (the brush device) 10 will be described later in detail.

The dust collecting part 11 is provided on the downstream side of the support boards 13 and the charging ground plates 14 in the air flow direction, and includes a plurality of dust collecting plates 15 arranged in parallel orientation to the support boards 13 and the charging ground plates 14, and a plurality of dust collecting voltage electrode plates 16 arranged in parallel so as to face the dust collecting plates 15.

The frame 8 includes end plates 17 provided facing each other, and ten coupling shafts 18 passed between the end plates 17 in a horizontal posture. Two coupling shafts 18 among the ten coupling shafts 18 support both the upper and lower end portions of the support boards 13, another four coupling shafts 18 support the upper, lower, left and right end portions of the dust collecting plates 15, and the remaining four coupling shafts 18 support the upper, lower, left and right end portions of the dust collecting voltage electrode plates 16.

To the coupling shaft 18 of the support board 13 and the coupling shaft 18 of the dust collecting voltage electrode plate 16, a power supply member 20 is mounted. The power supply member 20 of the support board 13 is fixed to a stay 19 provided on the end plate 17 via an insulator 29. The power supply member 20 of the dust collecting voltage electrode plate 16 is fixed to the frame 8 via the insulator 29. To the power supply members 20, a voltage supply part 21 (see FIG. 3) of a voltage power supply part (not shown) is electrically connected. When a power supply connection portion 22 of the power supply member 20 is connected to a power supply part (not shown) of the opening/closing door described above, a voltage is applied to the support board 13 and the dust collecting voltage electrode plate 16. The voltage power supply part described above is configured to generate the voltage by boosting the AC source power supply with a high-voltage transformer (not shown), then converting the AC current to DC with a doubling unit (not shown) and further boosting the voltage. In this embodiment, the outputs of the voltage applied to the charging part 10 and the dust collecting part 11 are different, but the same output voltage may be applied.

As shown in FIG. 3, the opening/closing door described above includes a control panel 28 provided with a display part 23, a setting operation part 24, an operation/stop switch 25, a safety switch 26 and a reset switch 27. The electrostatic precipitator 1 is also provided with a controller 30 having a memory 31 and a CPU 32, and the controller 30 is connected to the control panel 28 and each device (the fan 7, the voltage supply part 21 and the others) through an interface 33.

[Charging Part (Brush Device)]

Next, with reference to FIG. 4 to FIG. 14, the charging part (the brush device) 10 of the electrostatic precipitator 1 according to the embodiment of the present invention will be described in detail.

<Discharge Brush>

As described above, the charging part (the brush device) 10 includes the plurality of discharge brushes 12. Each discharge brush 12 has a bundle portion formed by bundling fibrous wire electrodes into a brush-shape. The wire electrode is made of non-magnetic stainless steel fiber having a diameter of 14 μm. As the stainless steel, SUS316 made of 18% Cr and 12% Ni added with molybdenum (Mo) and excellent in marketability, economic efficiency and corrosion resistance is used. The wire electrode may be made of other non-magnetic stainless steel, for example, SUS304 containing 18% Cr and 8% Ni.

By making the wire electrode of the discharge brush 12 with the non-magnetic stainless steel, the wire electrodes may be easily separated from the bundle portion of the discharge brush 12, thereby enhancing discharge performance. If the wire electrode is made of magnetic ferrite fiber, since it may be difficult for the wire electrode to separate from the bundle portion of the discharge brush 12, the effect of electric field interference with the discharge brush may be significant. Therefore, it is difficult to generate corona discharge with a strong electric field.

The bundle portion of one discharge brush 12 is formed, for example, by bundling about hundred (100) wire electrodes.

The discharge brush 12 may be formed by bundling ten (10) to two hundred (200) wire electrodes having a diameter of 5 to 25 μm. By forming the discharge brush 12 in this way, marketability and economic efficiency can be improved, and durability (rust resistance) and static elimination performance (charge performance) can be also improved.

Each discharge brush 12 is provided in a state extending from the support board 13 along the width direction of the support board 13 toward both the upstream and downstream sides of the air flow direction. This allows the number of discharge brush 12 to be increased and the number of the area where the corona discharge is generated to be increased, compared with a case where the discharge brush 12 is provided on one side of the support board 13 in the air flow direction. Therefore, it becomes possible to charge the airborne particles efficiently. As described below, the discharge brushes 12 may be arranged from the support board 13 only on the upstream side in the air flow direction, or may be arranged from the support board 13 only on the downstream side in the air flow direction.

The discharge brushes 12 are all formed to have almost the same length, and the tips of the discharge brushes 12 are aligned approximately. The protruding length of the discharge brush 12 (the length from the edge of the support board 13 to the tip of the discharge brush 12) is set to about 5 mm. The protruding length of the discharge brush 12 is preferably set in the range of 3 to 7 mm because the separable length is 3 mm or more and the self-standing length is 7 mm or less.

The discharge brushes 12 are provided intermittently at predetermined pitches along the longitudinal direction of the support board 13. The pitch between the adjacent discharge brushes 12 is preferably in the range of 5 to 10 mm. This allows the device to be downsized (high-density layout), and also improves dust collection performance (collection performance).

The voltage applied to the discharge brush 12 is in the range of 4 to 8 kV (in this embodiment, 8 kV). A negative voltage is applied to the discharge brush 12 by direct current. By adopting the direct current method, the configuration can be made relatively simple compared with other methods (AC, pulse). Also, by adopting the negative charging method, more discharge current can be applied to the discharge brush 12 in the same space (gap) compared with the positive charge method, and the discharge stability (property of being difficult to occur abnormal discharge) can also be improved.

<Holding Body>

Figure 9A:
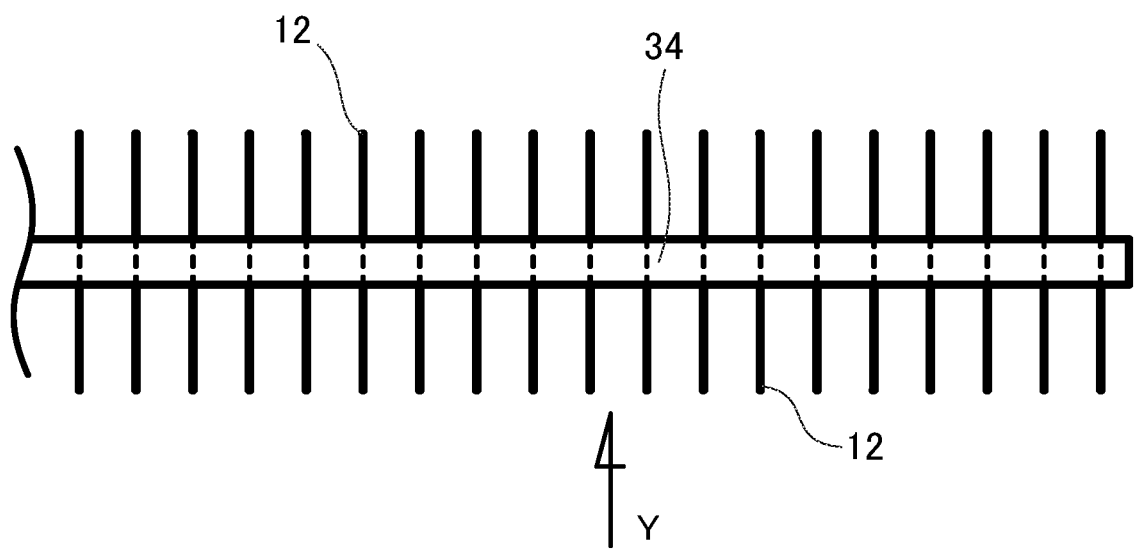
FIG. 9A is a plan view showing the discharge brush in the brush device of the electrostatic precipitator according to the embodiment of the present invention.
Figure 9B:
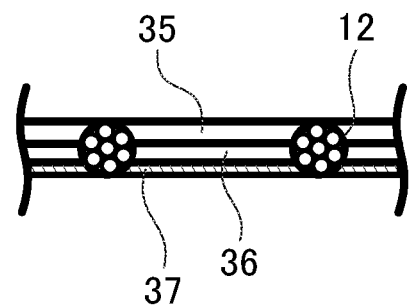
FIG. 9B is an enlarged arrow view showing the discharge brush viewed from the Y direction in FIG. 9A, in the brush device of the electrostatic precipitator according to the embodiment of the present invention.
Figure 10A:
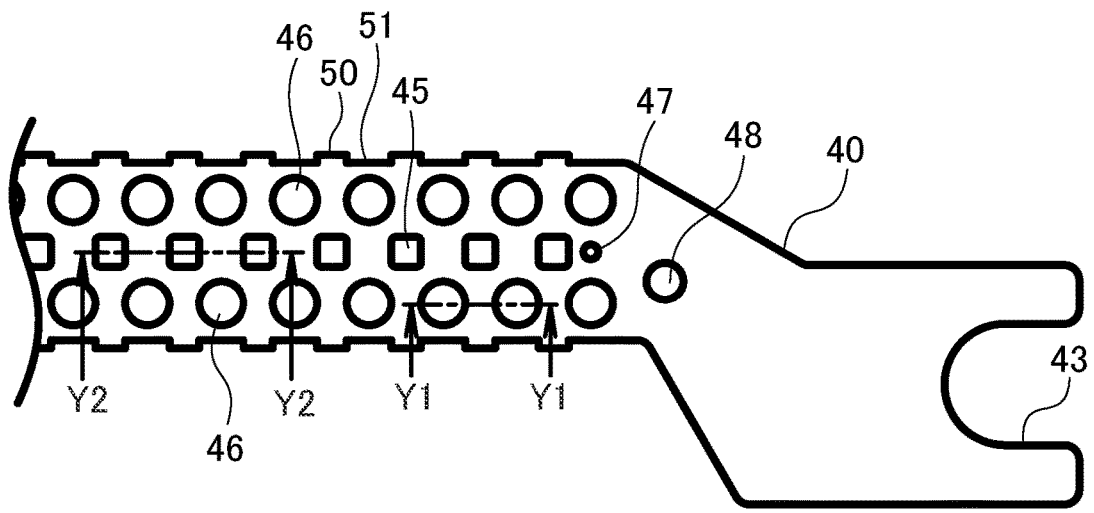
FIG. 10A is a plan view showing the base plate in the brush device of the electrostatic precipitator according to the embodiment of the present invention.
Figure 10B:
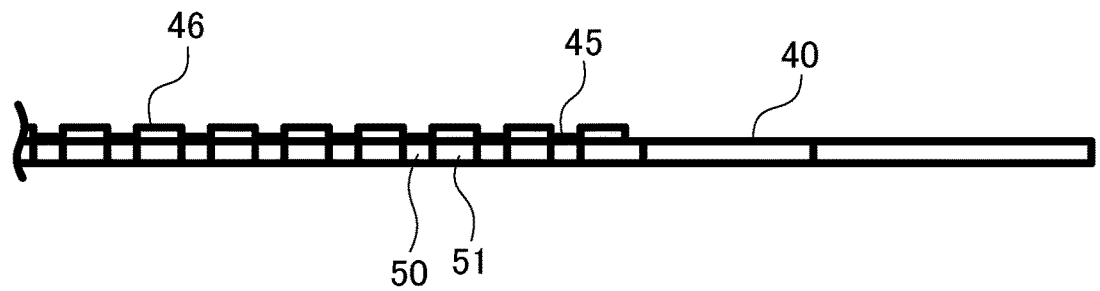
FIG. 10B is a side view showing the base plate in the brush device of the electrostatic precipitator according to the embodiment of the present invention.
Figure 10C:
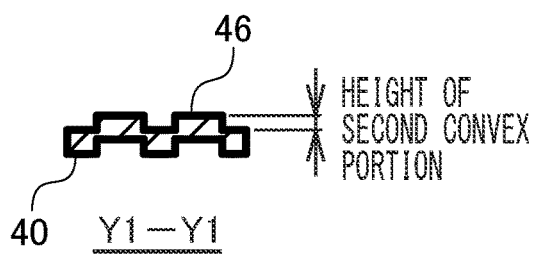
FIG. 10C is a sectional view taken along the line Y1-Y1 in FIG. 10A.
Figure 10D:
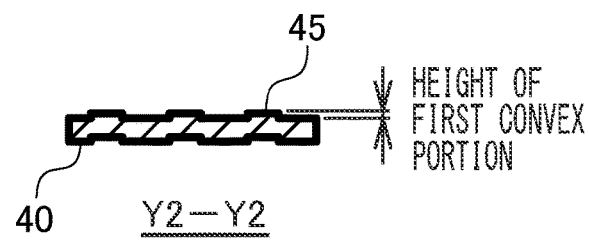
FIG. 10D is a sectional view taken along the line Y2-Y2 in FIG. 10A.

The plurality of discharge brushes 12 are held by a holding body 34 such that both the tip end portions of the discharge brushes 12 protrude. As shown in FIG. 9B, the holding body 34 includes a first holding body 35 and a second holding body 36 that hold the plurality of discharge brushes 12 from both sides. The first holding body 35 is a metal foil strip made of aluminum tape, and the second holding body 36 is a conductive double-sided tape with an adhesive layer 37. When attaching the holding body 34 to the support board 13, the double-sided tape of the second holding body 36 is peeled off and then the holding body 34 is adhered to the support board 13. In this case, at least one of the first holding body 35 and the second holding body 36 may have the conductive adhesive layer 37.

As the holding body 34, an aluminum tape-type brush that is widely available on the market as a member for static eliminating purposes may be used. In this case, since it is not necessary to prepare a manufacturing equipment for supplying the discharge brush 12 in the manufacturing process, the holding body 34 can be manufactured more easily and inexpensively, and the initial cost of the holding body 34 can be reduced. In addition, since the manufacturing process of the discharge brush 12 can be simplified, the manufacturing cost of the discharge brush 12 can also be reduced.

<Support Board>

As described above, the charging part (the brush device) 10 includes the plurality of support boards 13. In this embodiment, the support boards 13 are provided in seven rows in an orientation parallel to the air flow direction. The support board 13 is formed by joining a base plate 40 which is the first plate-shaped member and a press plate 41 which is the second plate-shaped member. Between the base plate 40 and the press plate 41, the plurality of discharge brushes 12 held by the holding body 34 is fixed. Both the base plate 40 and the press plate 41 are made of conductive metal formed in an elongated strip.

The base plate 40 is made of aluminum which has excellent workability, and has an elongated shape. The base plate 40 is subjected to a press punching process such that the side facing the press plate 41 is a fracture surface. With the fracture surface outside in this manner, it is possible to prevent sparks (abnormal electrical discharge) from occurring due to burrs on the fracture surface.

The base plate 40 is subjected to a press punching process such that a U-shaped groove 42 is formed at one end portion (the lower end portion) and a semicircular groove 43 is formed at the other end portion (the upper end portion). The U-shaped groove 42 and the semicircular groove 43 are each formed so as to engage with the coupling shaft 18. On the coupling shaft 18 with which the U-shaped groove 42 is engaged, grooves engageable with the U-shaped groove 42 are worked in parallel at equal intervals. On the coupling shaft 18 with which the semicircular groove 43 is engaged, a plurality of spacers 44 (see FIG. 2) is circumferentially provided. The pressing force of these spacers 44 fixes and holds the support boards 13 in parallel at equal intervals.

By this configuration, when the support board 13 is slid by weakening the clamping force of one coupling shaft 18, the semicircular groove 43 is disengaged from the coupling shaft 18. Then, by turning the support board 13 and separating it from the coupling shaft 18, the support board 13 can be detached from the charging and dust collecting part 6 easily. In addition, by forming one groove 42 of the base plate 40 in a U-shape having a greater groove depth than the other groove 43, when it is necessary to replace the support board 13, it becomes possible to detach and attach the support board 13 easily. When attaching the support board 13 to the charging and dust collecting part 6, the procedures can be performed in the reverse order of the procedures described above.

As well shown in FIG. 5 and FIG. 10A to FIG. 10D, the base plate 40 has a plurality of rectangular first convex portions 45, a plurality of circular second convex portions 46, a plurality of circular concave portions 47 and round holes 48, and a plurality of protrusions 50.

The first convex portions 45 and the second convex portions 46 are both formed by a half-punching process. The first convex portions 45 are formed at predetermined intervals along the longitudinal centerline of the base plate 40. The second convex portions 46 are formed at predetermined intervals in the longitudinal direction on both end sides in the width direction of the base plate 40, and are disposed at positions corresponding to the intervals of the first convex portions 45 and at positions corresponding outside the outermost first convex portions 45 in the longitudinal direction. The height of the first convex portions 45 and the second convex portions 46 is set such that the holding body 34 disposed on the upper surfaces of the first convex portions 45 does not protrude upward from the support board 13 when the base plate 40 is joined to the press plate 41.

The concave portion 47 is a center punch for positioning the holding body 34, and is formed outside the outermost first convex portions 45 in the longitudinal direction (between the outermost second convex portions 46 in the longitudinal direction). The round hole 48 is a hole for positioning the base plate 40 and the press plate 41, and is formed outside the outermost concave portions 47 in the longitudinal direction, and is configured to be engaged with a pin of a manufacturing jig.

The protrusions 50 are formed at predetermined intervals in the longitudinal direction on both the end surfaces in the width direction of the base plate 40, and are disposed at positions corresponding to the first convex portions 45. Thereby, grooves 51 are formed between the protrusion 50 on both the end surfaces in the width direction of the base plate 40, and the grooves 51 are disposed at the positions corresponding to the second convex portions 46.

The press plate 41 is made of stainless steel excellent in strength, and has an elongated shape. As well shown in FIG. 5 and FIG. 11A and FIG. 11B, the press plate 41 is subjected to the press punching process, and the end portions of the press plate in the width direction are subjected to a bending process. Therefore, the press plate 41 has a plurality of rectangular first openings 52, a plurality of circular second openings 53, a plurality of round holes 54 and a plurality of bent portions 55 (the entering prevention means).

The first openings 52 are formed at predetermined intervals along the longitudinal centerline of the press plate 41.

The first opening 52 has a dimension one size larger than the first convex portion 45 of the base plate 40 so that the first convex portion 45 can be fitted inside.

The second openings 53 are formed at predetermined intervals in the longitudinal direction at both the end sides in the width direction of the press plate 41. The second opening 53 has a dimension one size larger than the second convex portion 46 of the base plate 40 so as to be appropriately caulked with the second convex portion 46 to form a caulked portion 49 as the coupling means.

The round hole 54 is a hole for positioning the base plate 40 and the press plate 41, and is formed at a position corresponding to the round hole 48 of the base plate 40 at both the end portions in the longitudinal direction of the press plate 41, and is configured to be engaged with the pin of the manufacturing jig.

The bent portions 55 are formed at predetermined intervals in the longitudinal direction on both the end surfaces in the width direction of the press plate 41. The bent portions 55 are bent toward the facing base plate 40, and are fitted into the grooves 51 of the base plate 40 when the base plate 40 is joined to the press plate 41 such that the tip end portions of the bent portions 55 form the same surface as a non-joined surface of the base plate 40 or dent slightly from the non-joined surface of the base plate 40 so as not to protrude from the non-joined surface (see FIG. 7).

Figure 11A:
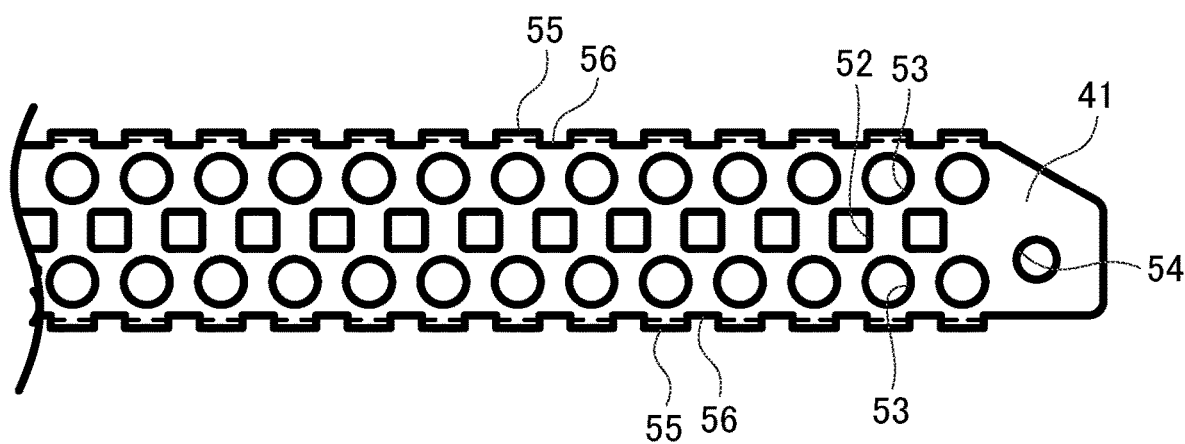
FIG. 11A is a plan view showing the press plate in the brush device of the electrostatic precipitator according to the embodiment of the present invention.
Figure 11B:
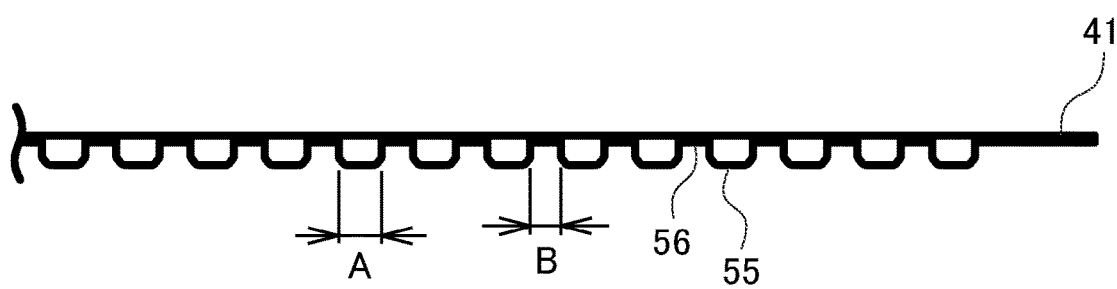
FIG. 11B is a side view showing the press plate in the brush device of the electrostatic precipitator according to the embodiment of the present invention.

By forming the bent portion 55 in this manner, bending relief portions 56 are formed between the bent portions 55 on both the end surfaces in the width direction of the press plate 41. As shown in FIG. 11B, the length A of the bent portion 55 is set to be long enough not to come into contact with the discharge brush 12. The length B of the bending relief portion 56 is set to be larger than the width of the discharge brush 12, and it is set to A>B in consideration of the workability of the press plate 41.

Figure 8:
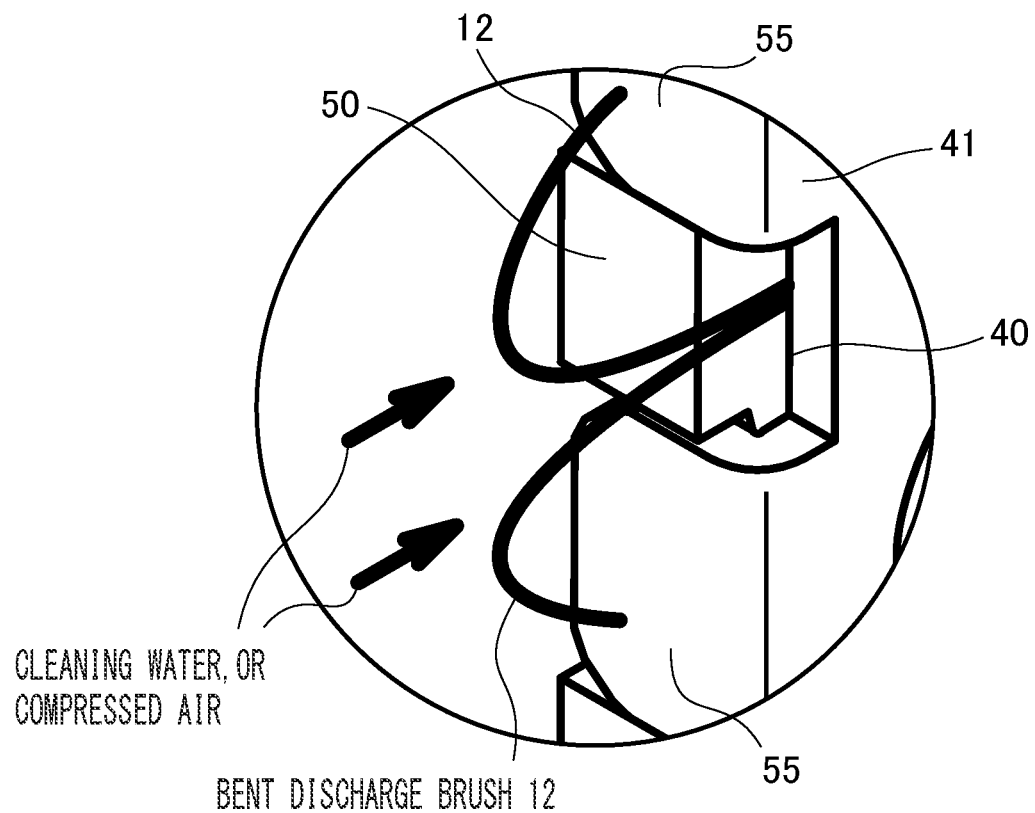
FIG. 8 is an enlarged perspective view showing the bent discharge brush of the brush device of the electrostatic precipitator according to the embodiment of the present invention.

As shown in FIG. 8, when the support board 13 is cleaned with cleaning water or air-blown (blowing by compressed air) for maintenance, the wire electrode of the discharge brush 12 may be bent because of its softness. If the bent wire electrode of the discharge brush 12 enters into the gap between the base plate 40 and the press plate 41, it becomes impossible to discharge electricity. This causes a decrease in the number of discharge points. In reality, a large number of discharge brushes may bend or flex, but since it is difficult to understand if all of the discharge brushes are illustrated, FIG. 8 shows only two of the upper and lower discharge brushes in a simplified manner.

However, as described above, since the charging part (the brush device) 10 according to the embodiment of the present invention has the bent portions 55, the above problem is prevented from occurring. Furthermore, the base plate 40 is provided with the protrusions 50 in order to fill the gaps between the bent portions 55 of the press plate 41, and the protrusions 50 prevent some of the wire electrodes of the discharge brush 12 from entering into the gap between the base plate 40 and the press plate 41 (the shaded area in FIG. 7) even during cleaning and air blowing. The protruding length of the protrusion 50 is preferably set to be approximately equal to the thickness of the bent portion 55.

The bent portion 55 may be provided on one end surface in the width direction of the base plate 40 and the other surface in the width direction of the press plate 41, or be provided alternately on both the end surfaces in the width direction of the base plate 40 and the press plate 41.

<Supporting Method of Discharge Brush by Support Board>

Figure 12A:
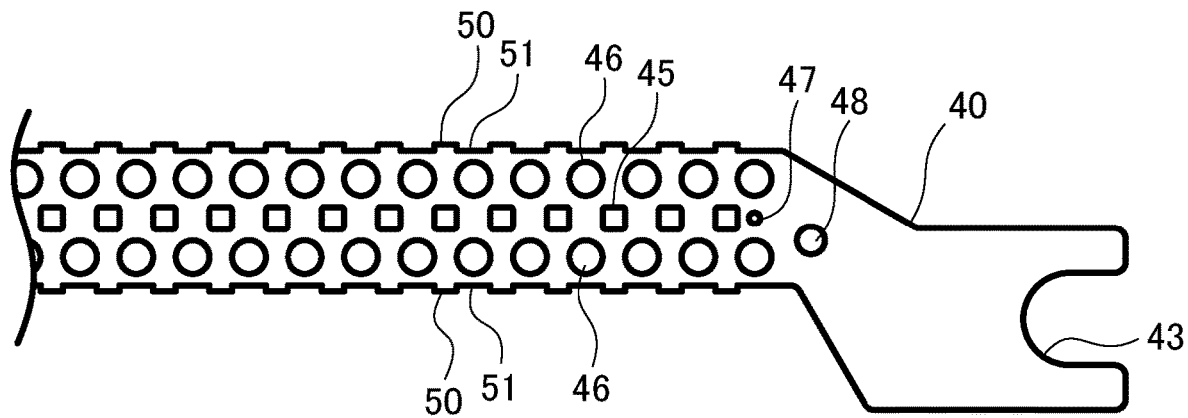
FIG. 12A is a plan view showing the base plate in the brush device of the electrostatic precipitator according to the embodiment of the present invention.

Next, with reference to FIG. 12A to FIG. 12C, FIG. 13A to FIG. 13D and FIG. 14, the method to support the discharge brushes 12 by the support board 13 having the configuration described above will be described. FIG. 12A is a plan view showing the base plate 40, FIG. 12B is a plan view showing a state where the holding body 34 holding the discharge brushes 12 is adhered on the base plate 40, FIG. 12C is a plan view showing a state where the press plate 41 is fixed on the base plate 40 to which the holding body 34 holding the discharge brushes 12 is adhered, FIG. 13A is a side view showing the base plate 40 and the holding body 34 supporting the discharge brushes 12, FIG. 13B is a side view showing a state where the holding body 34 holding the discharge brushes 12 is adhered on the base plate 40, FIG. 13C is a side view showing the base plate 40 on which the holding body 34 holding the discharge brushes 12 is adhered and the press plate 41, FIG. 13D is a side view showing a state where the press plate 41 is fixed on the base plate 40 on which the holding body 34 holding the discharge brushes 12 is adhered, and FIG. 14 is a sectional view taken along the line X-X in FIG. 13D.

Figure 13A:
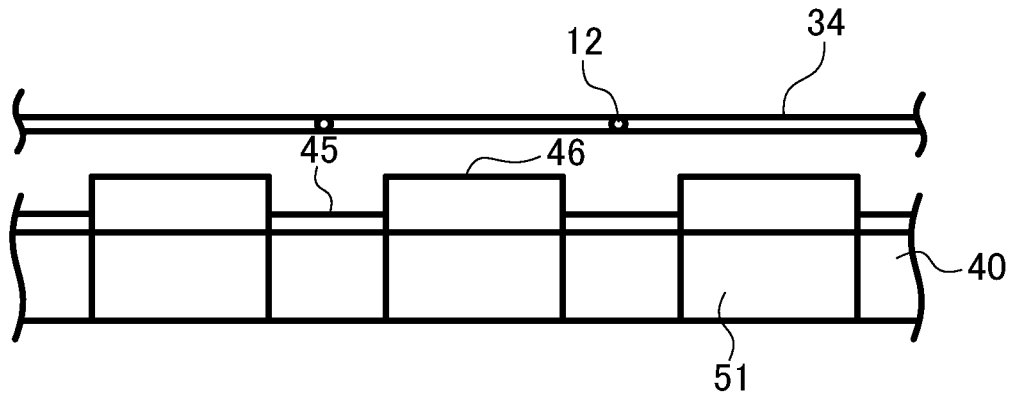
FIG. 13A is a side view showing the base plate and the holding body holding the discharge brushes, in the brush device of the electrostatic precipitator according to the embodiment of the present invention.
Figure 14:
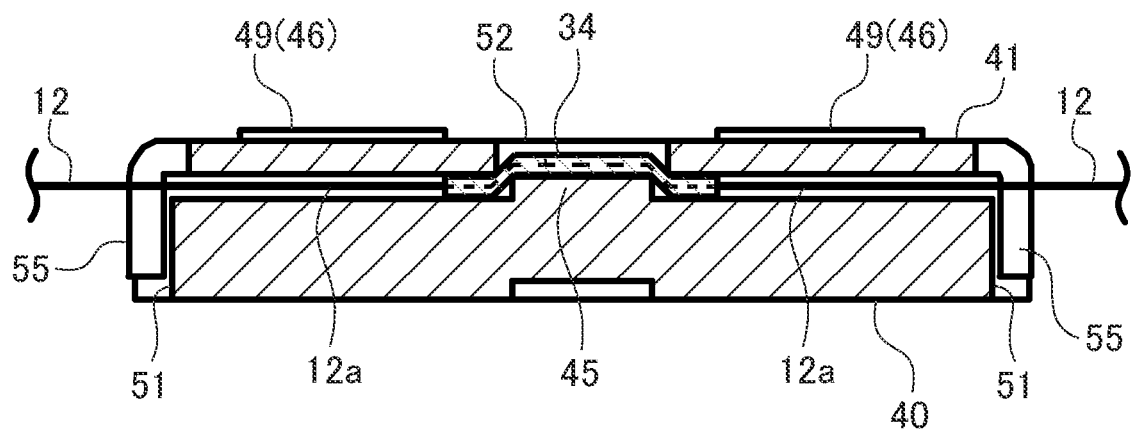
FIG. 14 is a sectional view taken along the line X-X in FIG. 13D.
Figure 15:
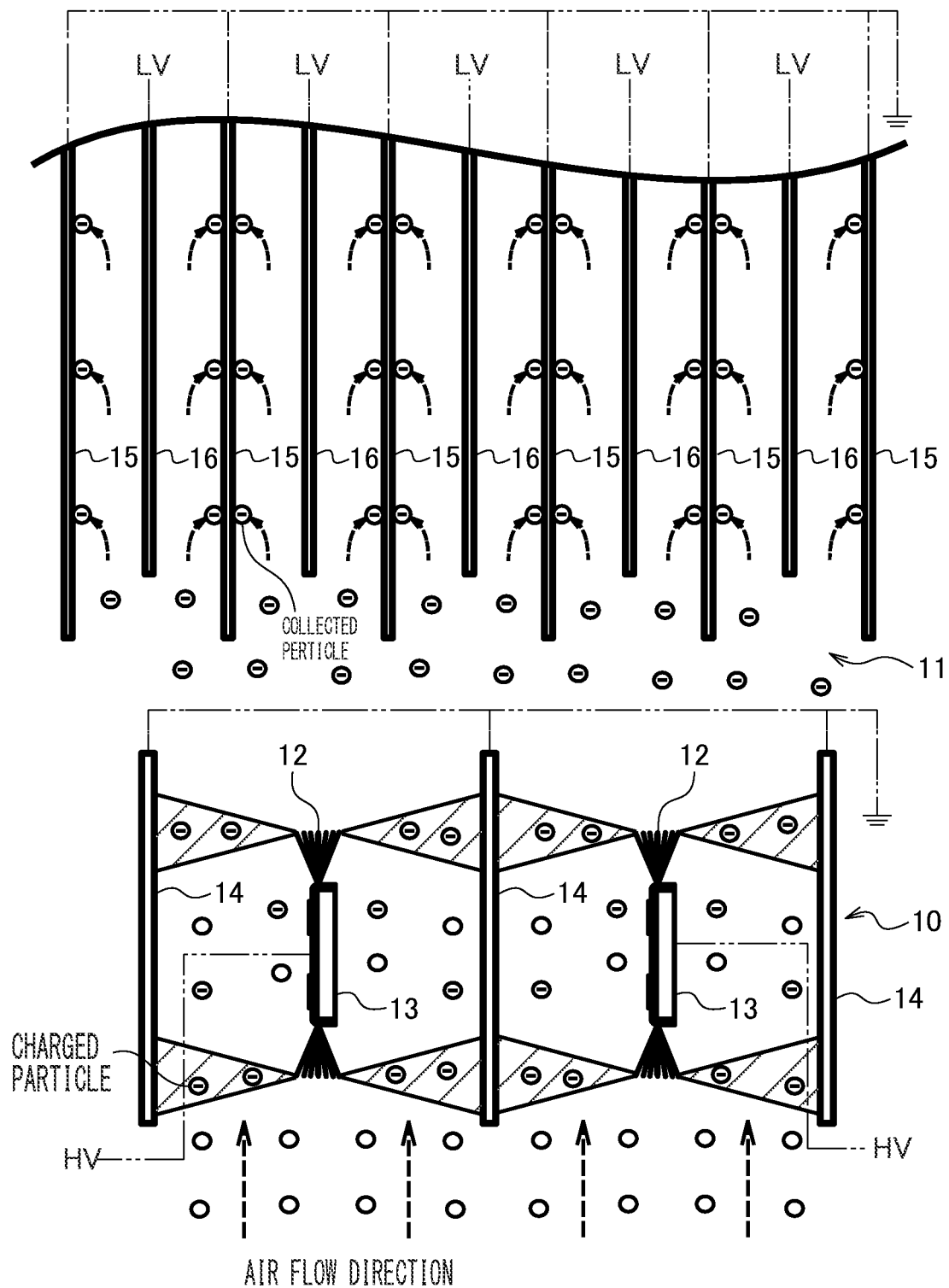
FIG. 15 is a plan view showing a state in which airborne particles are charged and collected, in the charging dust collecting part of the electrostatic precipitator according to the embodiment of the present invention.

First, as shown in FIG. 12A and FIG. 13A, the base plate 40 is set on the manufacturing jig (not shown) with the first convex portions 45 and the second convex portions 46 upward. At this time, the two pins standing on the manufacturing jig are made to penetrate the round holes 48 formed in both the end portions of the base plate 40, so that the base plate 40 is set in the manufacturing jig in a positioned state.

Figure 12B:
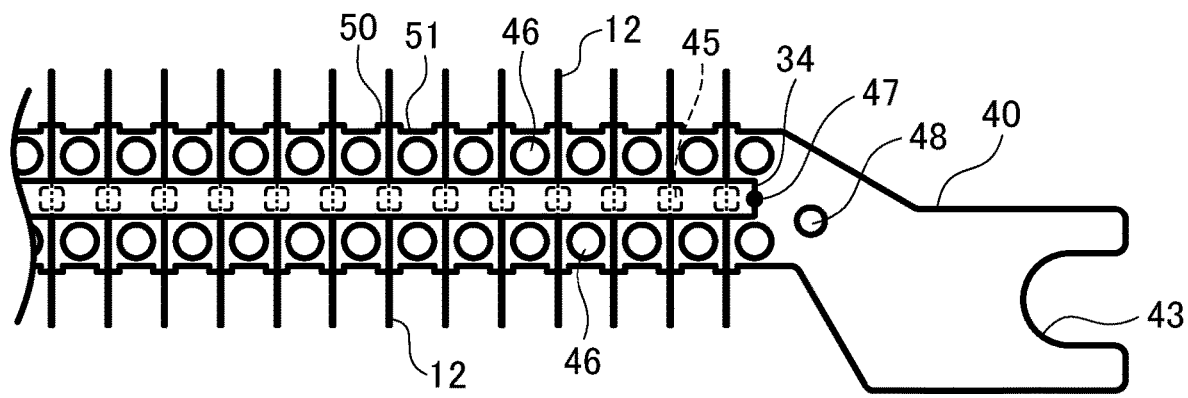
FIG. 12B is a plan view showing a state where the holding body holding the discharge brushes is adhered on the base plate, in the brush device of the electrostatic precipitator according to the embodiment of the present invention.
Figure 12C:
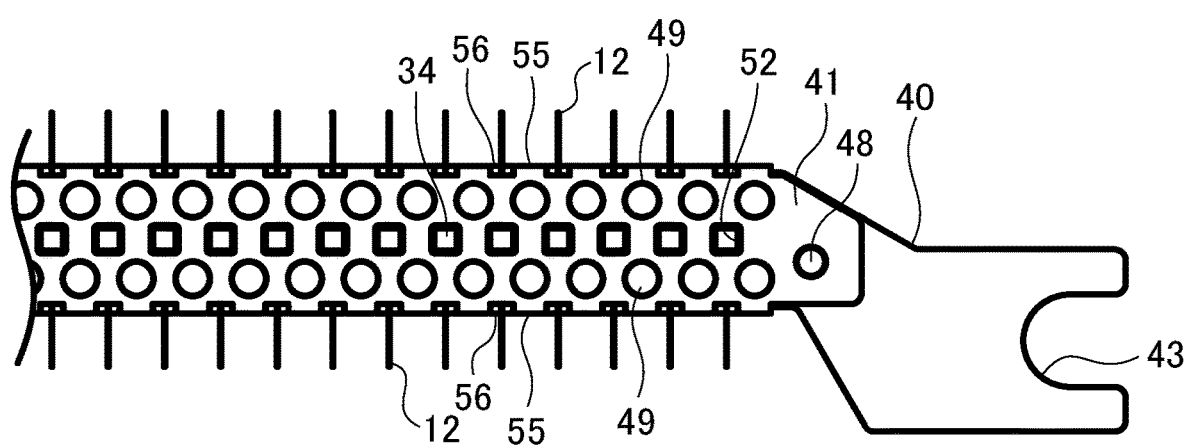
FIG. 12C is a plan view showing a state where the press plate is fixed on the base plate on which the holding body holding the discharge brushes is adhered, in the brush device of the electrostatic precipitator according to the embodiment of the present invention.
Figure 13B:
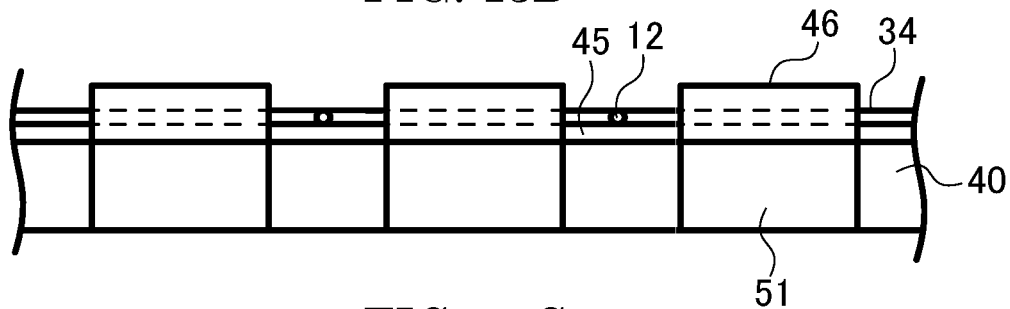
FIG. 13B is a side view showing a state where the holding body holding the discharge brushes is adhered on the base plate, in the brush device of the electrostatic precipitator according to the embodiment of the present invention.
Figure 13C:
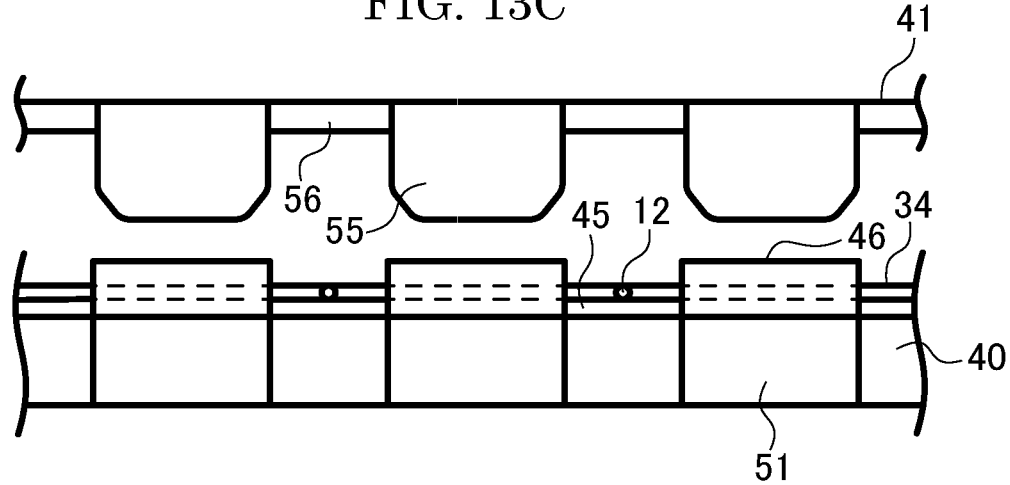
FIG. 13C is a side view showing the base plate on which the holding body holding the discharge brushes is adhered and the press plate, in the brush device of the electrostatic precipitator according to the embodiment of the present invention.
Figure 13D:
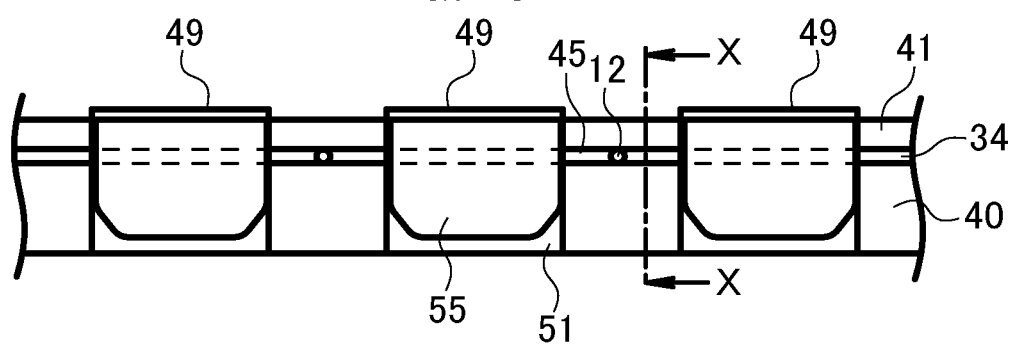
FIG. 13D is a side view showing a state where the press plate is fixed on the base plate on which the discharge brushes are adhered, in the brush device of the electrostatic precipitator according to the embodiment of the present invention.

Next, as shown in FIG. 12B and FIG. 13B, the double-sided tape of the second holding body 36 is peeled off, and using the concave portions 47 (the center punch for positioning) of the base plate 40, the holding body 34 holding the discharge brushes s 12 is adhered at the predetermined position on the base plate 40.

Note that prior to the processes shown in FIG. 12A and FIG. 13A, the processes shown in FIG. 12B and FIG. 13B may be performed.

Next, as shown in FIG. 13C, with the tip end portions of the bent portions 55 downward, through the round holes 54 of the press plate 41, the two pins of the aforementioned manufacturing jig are passed, and the press plate 41 is placed on the base plate 40 to which the holding body 34 holding the discharge brushes 12 is adhered. This allows the first convex portions 45, the second convex portions 46 and the bent portions 55 of the base plate 40 to engage with the first openings 52, the second openings 53 and the grooves 51 of the press plate 41, respectively.

Next, as shown in FIG. 12C, FIG. 13D and FIG. 14, using a caulking device (not shown), the second convex portions 46 of the base plate 40 and the second openings 53 of the press plate 41 are caulked to form the caulked portions 49 as the joining means. With these caulked portions 49, the base plate 40 and the press plate 41 are joined, and in a state where the caulked portions 49 are adjacently disposed on both sides of the plurality of discharge brushes 12 held by the holding body 34 opposite to each other, the plurality of discharge brushes 12 are fixed between the base plate 40 and the press plate 41.

FIG. 14 shows, for ease of viewing, that there are spaces between the upper surface of the held portion 12a of the discharge brush 12 and the lower surface of the press plate 41 and between the lower surface of the held portion 12a of the discharge brush 12 and the upper surface of the base plate 40. However, in reality, because the base plate 40 and the press plate 41 are tightly joined by caulking, the held portions 12a of the discharge brushes 12 are held by the base plate 40 and the press plate 41 with almost no gap.

Also, from FIG. 14, because the height of the first convex portions 45 is set such that the holding body 34 does not protrude from the first opening 52 of the press plate 41 (not extend outward from the opening), when the support board 13 is handled, the holding body 34 and the discharge brushes 12 held by the holding body 34 are prevented from being damaged.

When joining the base plate 40 and the press plate 41 in this manner, it is preferable that one of the base plate 40 and the press plate 41 is more easily deformed than the other. For example, by making the base plate 40 thicker and stronger while making the press plate 41 thinner and easier to be flexed, when joining the base plate 40 and the press plate 41, the press plate 41 comes into tightly contact with the base plate 40, so that the gap between the base plate 40 and the press plate 41 can be kept as small as possible.

In the embodiment of the present invention, the holding body 34 is disposed at a position where it does not interfere with the joining area between the base plate 40 and the press plate 41 (the caulked portion 49), so that the holding body 34 is not caulked together when the base plate 40 is joined to the press plate 41, and there is no risk of occurrence of joint defects.

As the joining method to join the base plate 40 and the press plate 41, there are various methods, such as welding (spot welding or the like), ultrasonic welding, screwing and adhering. However, the joining method by caulking, as in the embodiment of the present invention, is suitable because the base plate 40 and the press plate 41 can be firmly joined at low-cost. In the embodiment of the present invention, the shape of the caulked portion 49 is round, but it may be other shapes such as oval, rectangular, square, polygonal and the like.

In order to increase the tightness of the discharge brush 12, it is effective to increase the length of the discharge brush 12 that rides on the first convex portion 45. Therefore, the shape of the first convex portion 45 may be preferably a rectangle in which the length of the discharge brush 12 riding on the first convex portion 45 does not change even outside the center, rather than a round shape in which the length of the discharge brush 12 riding on the first convex portion 45 is shortened outside the center.

[Action of Electrostatic Precipitator]

Next, with reference to FIG. 1 to FIG. 3 and FIG. 15, the action of the electrostatic precipitator 1 of the embodiment of the present invention having the configuration described above will be described.

Dust-containing air flowing into the main body case 2 through the intake port 3 by driving the fan 7 is filtered by the pre-filter 5, and then flows into the charging part (the brush device) 10.

In the charging part (the brush device) 10, a voltage is applied to the discharge brushes 12 via the support board 13 and the holding body 34. The dust-containing air passes through the charging area formed between the discharge brushes 12 supported by the support board 13 and the charging ground plate 14 so that particles such as fine dust or mist and minute viruses in the dust-containing air are uniformly charged.

The charged particles, fine viruses and the others are then collected on the dust collecting plates 15 in the dust collecting part 11, filtered to become clean air, and then discharged through the exhaust port 4 to the outside of the electrostatic precipitator 1.

[Modified Examples of the Charging Part (Brush Device)]

Next, with reference to FIG. 16A to FIG. 16E, modified examples of the charging part (the brush device) 10 will be described.

Figure 16A:
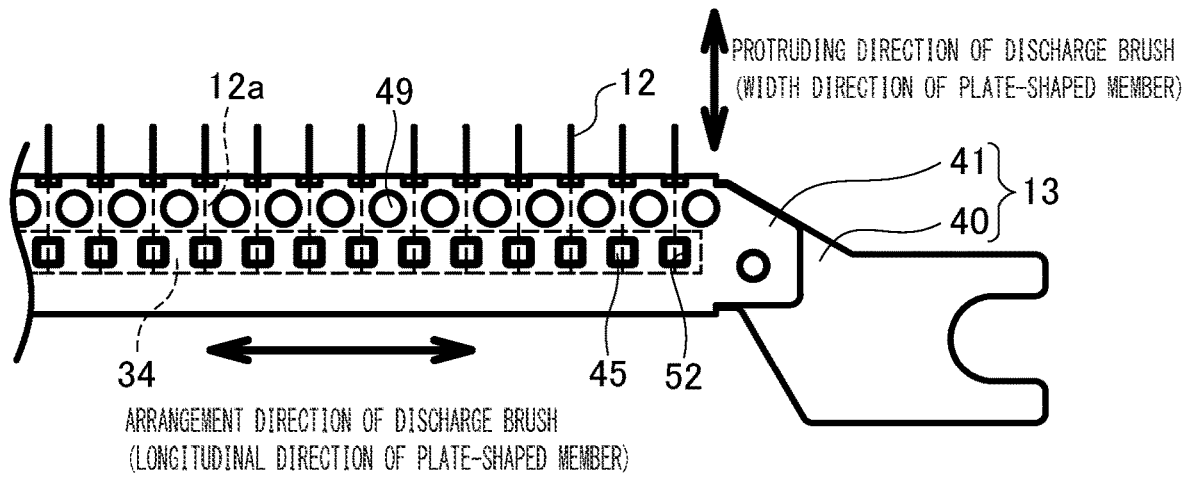
FIG. 16A is a plan view showing a modified example of the brush device of the electrostatic precipitator according to the embodiment of the present invention.

FIG. 16A shows a modified example where the discharge brushes 12 protrude from one side (the upper side in the figure) of the support board 13, and the ratio of the number of discharge brushes 12 to the number of caulked portions 49 is 1:1.

Figure 16B:
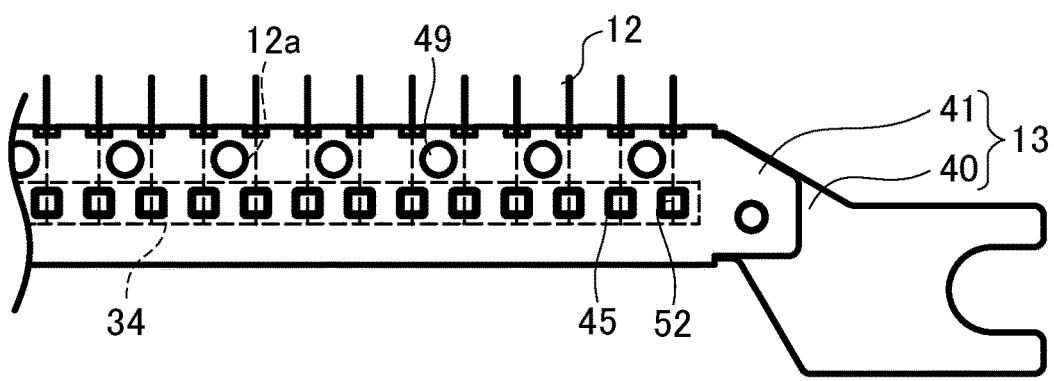
FIG. 16B is a plan view showing a modified example of the brush device of the electrostatic precipitator according to the embodiment of the present invention.

FIG. 16B shows a modified example where the discharge brushes 12 protrude from one side (the upper side in the figure) of the support board 13, and the ratio of the number of discharge brushes 12 to the number of caulked portions 49 is 2:1. In the modified examples shown in FIG. 16A and FIG. 16B, the discharge brush 12 in which the portion protruding from the holding body 34 to one side (the lower side in figure) is cut is used.

Figure 16C:
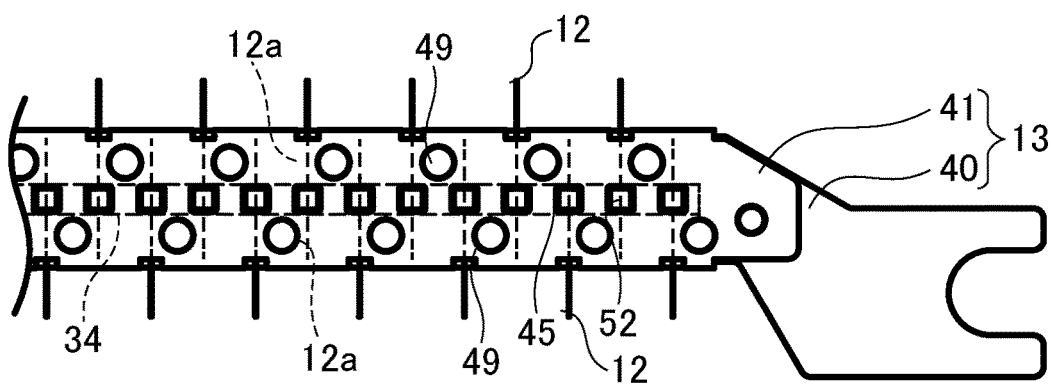
FIG. 16C is a plan view showing a modified example of the brush device of the electrostatic precipitator according to the embodiment of the present invention.

FIG. 16C show a modified example where the discharge brushes 12 protrude from both sides of the support board 13, the discharge brushes 12 and the caulked portions 49 are each disposed in a cross-stitch pattern, and the ratio of the number of discharge brushes 12 to the number of caulked portions 49 is 1:1.

Figure 16D:
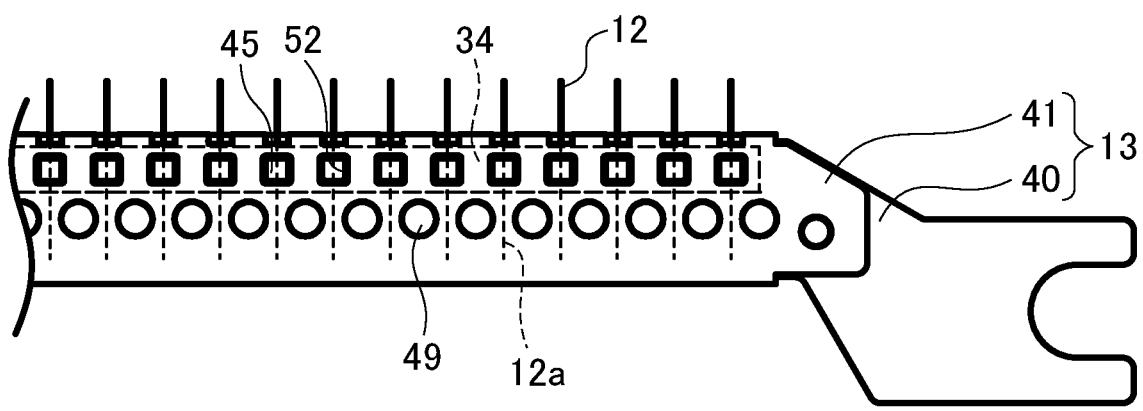
FIG. 16D is a plan view showing a modified example of the brush device of the electrostatic precipitator according to the embodiment of the present invention.

FIG. 16D shows a modified example the discharge brushes 12 protrude from one side (the upper side in the figure) of the support board 13, and the ratio of the number of discharge brushes 12 to the number of caulked portions 49 is 1:1.

Figure 16E:
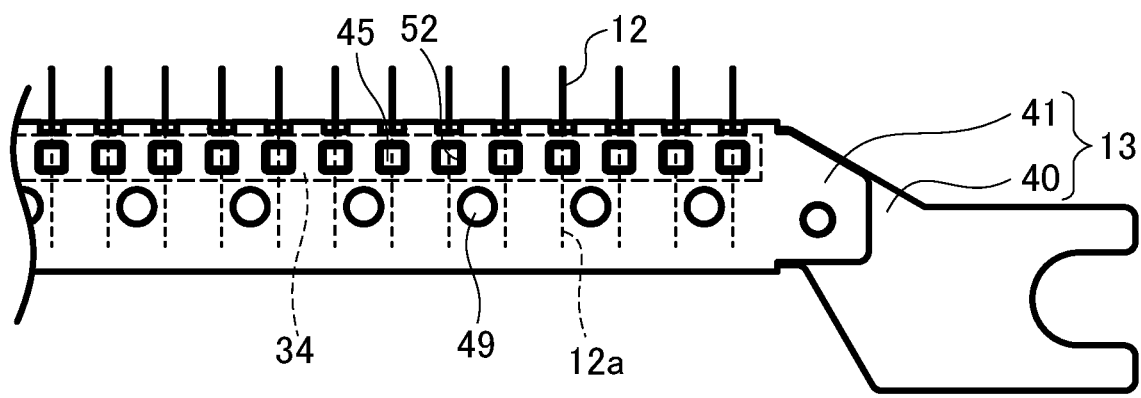
FIG. 16E is a plan view showing a modified example of the brush device of the electrostatic precipitator according to the embodiment of the present invention.

FIG. 16E shows a modified example the discharge brushes 12 protrude from one side (the upper side in the figure) of the support board 13, and the ratio of the number of discharge brushes 12 to the number of caulked portions 49 is 2:1.

In the modified examples shown in FIG. 16D and FIG. 16E, the discharge brushes 12 on one side (the lower side in the figure) do not protrude from the support board 13, but they protrude from the holding body 34 and extend to the position corresponding to the caulked portions 49 (they may also extend below the caulked portions 49.)

In the modified examples shown in FIG. 16D and FIG. 16E, the arrangement of the first convex portions 45 and the first openings 52, and the caulked portions 49 are opposite to the arrangement in the modified examples shown in FIG. 16A to FIG. 16C (in the modified examples shown in FIG. 16A to FIG. 16C, the first openings 52 are arranged at almost the center portion in the width direction of the support board 13, while in the modified examples shown in FIG. 16D and FIG. 16E, the caulked portions 49 are arranged at almost the center portion in the width direction of the support board 13).

In the embodiments of the invention described above, the electrostatic precipitator equipped with a so-called one-stage charging and dust collecting part 6 in which the charging part (the brush device) 10 and the dust collecting part 11 are integrated, but it goes without saying that the invention can also be applied to a two-stage type electrostatic precipitator in which the charging part 10 and the dust collecting part 11 are separately provided. It is also possible to use the present invention for the charging part of an air cleaner.

In the above description of the embodiments of the present invention, various technically preferable limitations may be attached, but the technical scope of the present invention is not limited to these aspects unless otherwise stated that limit the present invention. In other words, the components in the above embodiments of the invention can be replaced with existing components, etc., as appropriate, and various variations including combinations with other existing components are possible, and the description of the above embodiments of the invention does not limit the content of the invention described in the claims. The above description of the embodiments of the invention does not limit the content of the invention described in the claims.

INDUSTRIAL APPLICABILITY

The technology of the present invention is expected to be used in a brush device of a static eliminator that eliminates static electricity of charged particles, an electrostatic precipitator that draws in dust and oil mist generated in processing plants and then collect them, and an air cleaner for home and commercial use.

The invention claimed is:

1. A brush device which charges airborne particles or eliminates static electricity of charged particles by corona discharge generated by applying voltage, the brush device comprising:
   a plurality of discharge brushes which are disposed at intervals in a disposing direction and are formed by bundling fibrous wire electrodes;
   a strip-shaped support board including a first plate-shaped member and a second plate-shaped member which hold the plurality of discharge brushes;
   a joining means for joining the first plate-shaped member and the second plate-shaped member; and
   an entering prevention means covering a gap formed between the first plate-shaped member and the second plate-shaped member which hold the plurality of discharge brushes, on an end surface in a width direction of the strip-shaped support board, wherein
   the disposing direction is a longitudinal direction of the strip-shaped support board, and the plurality of discharge brushes is disposed with tip end portions of the plurality of discharge brushes protruding from the strip-shaped support board along the width direction of the strip-shaped support board, and
   the joining means is disposed adjacent to each brush of the plurality of discharge brushes.

2. The brush device according to claim 1, wherein the joining means is disposed away from said each brush of the plurality of discharge brushes.

3. The brush device according to claim 1, wherein the strip-shaped support board is formed by joining the first plate-shaped member and the second plate-shaped member such that fracture surfaces of the first plate-shaped member and the second plate-shaped member face each other.

4. The brush device according to claim 1, wherein the strip-shaped support board is formed by caulking the first plate-shaped member and the second plate-shaped member.

5. The brush device according to claim 1, wherein one plate-shaped member of the first plate-shaped member and the second plate-shaped member is provided with a convex portion at a position where one brush of the plurality of discharge brushes is disposed, and the other plate-shaped member is provided with an opening capable of being fitted into the convex portion.

6. The brush device according to claim 5, wherein the convex portion is shaped in a rectangle.

7. The brush device according to claim 5, wherein the plurality of discharge brushes includes a holding body holding the plurality of discharge brushes such that the tip end portions of the plurality of discharge brushes protrude,
   the holding body is disposed on an upper surface of the convex portion, and
   a height of the convex portion is set such that the holding body does not protrude from the opening when the first plate-shaped member and the second plate-shaped member are joined.

8. The brush device according to claim 6, wherein the plurality of discharge brushes includes a holding body holding the plurality of discharge brushes such that the tip end portions of the plurality of discharge brushes protrude,
   the holding body is disposed on an upper surface of the convex portion, and
   a height of the convex portion is set such that the holding body does not protrude from the opening when the first plate-shaped member and the second plate-shaped member are joined.

9. The brush device according to claim 1, wherein the entering prevention means includes a bent portion formed in an end portion in a width direction of at least one of the first plate-shaped member and the second plate-shaped member.

10. The brush device according to claim 9, wherein the entering prevention means includes a first bent portion and a second bent portion,
    the first bent portion is the bent portion,
    the second bent portion is a bent portion which is different from the first bent portion and is formed in the end portion in the width direction of the at least one of the first plate-shaped member and the second plate-shaped member, and
    a protrusion is formed in the end portion in the width direction of the at least one of the first plate-shaped member and the second plate-shaped member to fill a gap formed between the first bent portion and the second bent portion.

11. The brush device according to claim 1, further comprising:
    a first holding body and a second holding body which hold the plurality of discharge brushes such that the tip end portions of the plurality of discharge brushes protrude,
    the first holding body is disposed facing the first plate-shaped member,
    the second holding body is disposed facing the second plate-shaped member, and
    a voltage is applied to at least one of the first holding body and the second holding body via a conductive adhesive layer.

12. The brush device according to claim 1, wherein said each brush of the plurality of discharge brushes is formed by bundling 10 to 200 non-magnetic stainless steel fibrous wire electrodes each having a diameter of 5 to 25 μm.

13. An electrostatic precipitator including the brush device according to claim 1, the electrostatic precipitator comprising:
    a dust collecting part for collecting particles charged by the brush device; and
    a fan for drawing dust-containing air in, wherein
    the brush device and the dust collecting part are integrally formed, and
    the brush device, the dust collecting part and the fan are arranged in series in order from an upstream side in a flow direction of the dust-containing air.

14. An air cleaner including the brush device according to claim 1, the air cleaner comprising:
- an air intake port;
- an exhaust port;
- a fan; and
- a dust collecting part, wherein
- dust and fine particles contained in air drawn in through the air intake port by the fan are charged by the brush device, then adsorbed by the dust collecting part, and then clean air is discharged through the exhaust port.

15. A brush device which charges airborne particles or eliminates static electricity of charged particles by corona discharge generated by applying voltage, the brush device comprising:
- a plurality of discharge brushes which are disposed at intervals in a disposing direction and are formed by bundling fibrous wire electrodes;
- a strip-shaped support board including a first plate-shaped member and a second plate-shaped member which hold the plurality of discharge brushes; and
- a joining means for joining the first plate-shaped member and the second plate-shaped member, wherein
- the disposing direction is a longitudinal direction of the strip-shaped support board, and the plurality of discharge brushes is disposed with tip end portions of the plurality of discharge brushes protruding from the strip-shaped support board along a width direction of the strip-shaped support board,
- the joining means is disposed adjacent to each brush of the plurality of discharge brushes, and
- one plate-shaped member of the first plate-shaped member and the second plate-shaped member is provided with a convex portion at a position where one brush of the plurality of discharge brushes is disposed, and the other plate-shaped member is provided with an opening capable of being fitted into the convex portion.

16. The brush device according to claim 15, wherein
- the joining means is disposed away from said each brush of the plurality of discharge brushes.

17. The brush device according to claim 15, wherein
- the strip-shaped support board is formed by joining the first plate-shaped member and the second plate-shaped member such that fracture surfaces of the first plate-shaped member and the second plate-shaped member face each other.

18. The brush device according to claim 15, wherein
- the strip-shaped support board is formed by caulking the first plate-shaped member and the second plate-shaped member.

19. An electrostatic precipitator including the brush device according to claim 15, the electrostatic precipitator comprising:
- a dust collecting part for collecting particles charged by the brush device; and
- a fan for drawing dust-containing air in, wherein
- the brush device and the dust collecting part are integrally formed, and
- the brush device, the dust collecting part and the fan are arranged in series in order from an upstream side in a flow direction of the dust-containing air.

20. An air cleaner including the brush device according to claim 15, the air cleaner comprising:
- an air intake port;
- an exhaust port;
- a fan; and
- a dust collecting part, wherein
- dust and fine particles contained in air drawn in through the air intake port by the fan are charged by the brush device, then adsorbed by the dust collecting part, and then clean air is discharged through the exhaust port.

* * * * *